(12) United States Patent
Smith et al.

(10) Patent No.: US 11,937,167 B1
(45) Date of Patent: Mar. 19, 2024

(54) CLIENT MODIFICATION OF TRAFFIC TABLE IN MULTI CHANNEL WI-FI

(71) Applicant: Cable Television Laboratories, Inc., Louisville, CO (US)

(72) Inventors: Luther E. Smith, Fort Lupton, CO (US); Jonathan Ray Dennis, Aurora, CO (US); Aaron Quinto, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 154 days.

(21) Appl. No.: 17/367,018

(22) Filed: Jul. 2, 2021

Related U.S. Application Data

(63) Continuation-in-part of application No. 17/098,323, filed on Nov. 13, 2020, now abandoned, and a
(Continued)

(51) Int. Cl.
   *H04W 40/24* (2009.01)
   *H04L 45/00* (2022.01)
   *H04L 45/021* (2022.01)
   *H04W 28/12* (2009.01)
   *H04W 40/28* (2009.01)

(52) U.S. Cl.
   CPC ......... *H04W 40/248* (2013.01); *H04L 45/021* (2013.01); *H04L 45/38* (2013.01); *H04W 28/12* (2013.01); *H04W 40/28* (2013.01)

(58) Field of Classification Search
   CPC ..... H04W 40/24; H04W 40/28; H04W 28/12; H04W 24/08; H04W 74/08; H04W 72/51; H04W 84/12; H04W 80/02; H04L 29/12; H04L 12/725; H04L 12/709; H04L 47/10;
   (Continued)

(56) References Cited

U.S. PATENT DOCUMENTS 8,743,851 B2 * 6/2014 Banerjea ............... H04W 84/12
                                              370/462
8,767,692 B2 * 7/2014 Kim ....................... H04W 76/14
                                              370/429
(Continued)

OTHER PUBLICATIONS

Traffic Separation Using Dual Wi-Fi Interface to Enhance WLAN System Throughput, Takayuki Nishio, Ryo Nishioka, Masahiro Morikura and Koji Yamamota, IEEE 2014.
(Continued)

*Primary Examiner* — Man U Phan
(74) *Attorney, Agent, or Firm* — Elevated IP, LLC

(57) ABSTRACT

Systems, methods, and devices disclosed herein contemplate client updates to traffic filter tables that control delivery of network traffic from an access point to the client over a multi channel wireless network. The client may update the traffic filter table whenever: (i) an application on the client initiates the request; (ii) an application matching a secondary channel requirement in a look-up table is opened or closed; (iii) data characteristics matching the secondary channel requirement in the look-up table are detected or removed; (iv) data usage of the client meets or exceeds a predetermined threshold; (v) data usage of the client falls below a predetermined threshold; and/or (vi) a specified period of time has passed.

3 Claims, 18 Drawing Sheets

Related U.S. Application Data continuation-in-part of application No. 15/918,532, filed on Mar. 12, 2018, now Pat. No. 11,323,359.

(60) Provisional application No. 63/047,679, filed on Jul. 2, 2020.

(58) Field of Classification Search
CPC ....... H04L 67/02; H04L 67/42; H04L 12/911; H04L 29/06; H04L 29/08
USPC .......................................................... 370/431
See application file for complete search history.

(56) References Cited

U.S. PATENT DOCUMENTS

| | | | |
|---|---|---|---|
| 9,201,835 B2 * | 12/2015 | Akin | ................. G06F 15/16 |
| 9,271,291 B2 * | 2/2016 | Gauvreau | ......... H04W 72/0453 |
| 9,386,475 B2 * | 7/2016 | Liu | ................. H04W 72/02 |
| 9,736,070 B2 * | 8/2017 | Biswas | ............... H04L 45/7453 |
| 9,838,923 B1 | 12/2017 | Sitton et al. | |
| 10,051,688 B1 | 8/2018 | Huang et al. | |
| 10,075,387 B1 | 9/2018 | Avasol | |
| 10,244,536 B1 | 3/2019 | Jiang et al. | |
| 10,681,732 B2 * | 6/2020 | Gong | ................. H04W 74/0816 |
| 11,032,207 B2 * | 6/2021 | Patil | ................. H04L 47/41 |
| 11,424,985 B2 * | 8/2022 | Gaikwad | ............. H04L 41/0896 |
| 11,576,114 B2 * | 2/2023 | Tu | ................. H04L 47/193 |
| 2003/0210663 A1 | 11/2003 | Everson et al. | |
| 2006/0270339 A1 | 11/2006 | Mahany | |
| 2008/0219281 A1 | 9/2008 | Akin et al. | |
| 2008/0285553 A1 | 11/2008 | Abdulla et al. | |
| 2009/0135829 A1 | 5/2009 | Zheng | |
| 2012/0052900 A1 | 3/2012 | Liu et al. | |
| 2012/0057511 A1 | 3/2012 | Sivakumar et al. | |
| 2013/0077554 A1 | 3/2013 | Gauvreau et al. | |
| 2013/0141308 A1 * | 6/2013 | Huang | ............. H04N 21/41407 345/2.1 |
| 2013/0235884 A1 | 9/2013 | Mamidwar et al. | |
| 2015/0071287 A1 | 3/2015 | Berman | |
| 2015/0208451 A1 | 7/2015 | Tzoreff et al. | |
| 2015/0289299 A1 | 10/2015 | Abraham et al. | |
| 2015/0372917 A1 | 12/2015 | Biswas et al. | |
| 2016/0142365 A1 | 5/2016 | Devarajan | |
| 2016/0212755 A1 | 7/2016 | Cao et al. | |
| 2016/0249267 A1 | 8/2016 | Ho et al. | |
| 2017/0245297 A1 | 8/2017 | Wild et al. | |
| 2018/0199342 A1 * | 7/2018 | Rai | ........................ H04K 3/226 |
| 2018/0234335 A1 * | 8/2018 | Sridhar | ................. H04L 1/1607 |
| 2018/0270143 A1 | 9/2018 | Currivan et al. | |
| 2018/0351867 A1 | 12/2018 | Dhanabalan et al. | |

OTHER PUBLICATIONS

IEEE Std 802.11-2012 "Part 11: Wireless LAN Medium Access Control (MAC) and Physical Layer (PHY) Specifications" (Year: 2012).

* cited by examiner

CLIENT MODIFICATION OF TRAFFIC TABLE IN MULTI CHANNEL WI-FI

CROSS-REFERENCE TO RELATED APPLICATIONS

This application is a continuation-in-part of U.S. patent application Ser. No. 17/098,323, filed Nov. 13, 2020, which claims priority to U.S. Provisional Patent Application Ser. No. 62/934,660, filed Nov. 13, 2019, and is a continuation-in-part of U.S. patent application Ser. No. 15/918,532, filed Mar. 12, 2018, now U.S. Pat. No. 11,323,359, issued May 3, 2022, which claims priority to U.S. Patent Application Ser. No. 62/542,437, filed Aug. 8, 2017. This application claims priority to U.S. Provisional Patent Application Ser. No. 63/047,679, filed Jul. 2, 2020. The subject matter of each of these applications is incorporated herein by reference in its entirety.

BACKGROUND

The present invention relates to multi-channel communication, such as but not necessarily limited to multi-channel communication of the type sufficient to facilitate data delivery utilizing two or more wireless and/or wired channels/paths associated with an access point configured to facilitate communications with a plurality of devices.

BACKGROUND

An address remapper is a Linux kernel module which provides means of policy-based layer-2 traffic switching. In some examples, rules and/or filters may be defined that can rewrite a destination address (e.g., a destination MAC address) of matching outbound Ethernet frames. In some examples, the frames can be rerouted onto a different bridge interface in this way. Filters may be configured to catch traffic as high as layer-4. In some examples, an address remapper (e.g., a medium access control (MAC) address remapper) may be implemented according to various projects or guidelines, for example, being designed to meet the needs of the Dual-Channel Wi-Fi project. In another example, a Dual-Channel Wi-Fi client may have two Ethernet/Wi-Fi interfaces (e.g., eth0 and eth1), but only one IP (192.168.1.100) interface. Traffic destined for 192.168.1.100 may be transported either via eth0 or eth1 at a Dual-Channel Wi-Fi router's discretion. For example, Linux "ebtables" tools have been explored as a means of implementing this purpose, but these tools do not provide functionality required for this application. For example, the "ebtables" tools may provide only limited layer-3-level filtering whereas a MAC address remapper may provide the ability to statically filter frames as high as layer-4 (e.g. TCP/UDP). In addition to the higher-layer filtering, another requirement for this application is load balancing. When a client uses several Ethernet/Wi-Fi interfaces, a load-balancing policy and implementation will be required to process traffic destined for these endpoints.

SUMMARY

In an aspect, a method for multi-channel communication between a client and an access point over a wireless network including at least a primary channel and a secondary channel, comprises: receiving, at an access point, a request from a client for a traffic filter table comprising instructions for delivering network traffic to the client over a secondary channel of a wireless network having a primary channel and the secondary channel; providing the traffic filter table to the client; receiving, at the access point, an updated traffic filter table from the client; and delivering the network traffic to the client according to the updated traffic filter table.

In an embodiment, the request from the client for the traffic filter table is triggered when: (i) an application on the client initiates the request; (ii) an application matching a secondary channel requirement in a look-up table is opened or closed; (iii) data characteristics matching the secondary channel requirement in the look-up table are detected or removed; (iv) data usage of the client meets or exceeds a predetermined threshold; (v) data usage of the client falls below a predetermined threshold; and/or (vi) a specified period of time has passed.

In an embodiment, delivering network traffic over the multi-channel wireless network comprises bidirectionally communicating network traffic to the client over the primary channel and unidirectionally communicating network traffic to the client over the secondary channel and, optionally, over a tertiary channel.

In an aspect, a non-transitory computer-readable medium has a plurality of non-transitory instructions executable with a processor of an access point to facilitate multi-channel communications over a wireless network, the plurality of non-transitory instructions being executable for: determining a client having multi-channel capabilities sufficient to facilitate communication with the access point; enabling downstream and upstream communication of network traffic for the client over a primary channel of the wireless network; enabling downstream communication of at least a portion of network traffic for the client over a secondary channel of the wireless network; and transferring downstream communication of network traffic from the secondary channel to a tertiary channel based on a traffic filter table prepared by the client.

In an embodiment, the plurality of non-transitory instructions are further executable for forwarding a traffic filter table to the client upon request, receiving an updated traffic filter table from the client, and/or enabling downstream communication of one portion of network traffic for the client over the secondary channel and enabling downstream communication of another portion of network traffic for the client over a tertiary channel of the wireless network.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings, wherein.

At the first step, the device may identify downstream and upstream communication of network traffic for a first device over a primary channel of the access point.

At the second step, the device may identify downstream communication of network traffic for the first device over a secondary channel of the access point.

At the third step, the device may select respective portions of the network traffic information to be provided via the enabled downstream and upstream communications of network traffic based on an address of each of the respective portions.

At the fourth step, the device may determine a remapping of the address for each of the respective portions.

At the fifth step, the device may determine a remapping of the address for each of the respective portions.

Figure 14A:
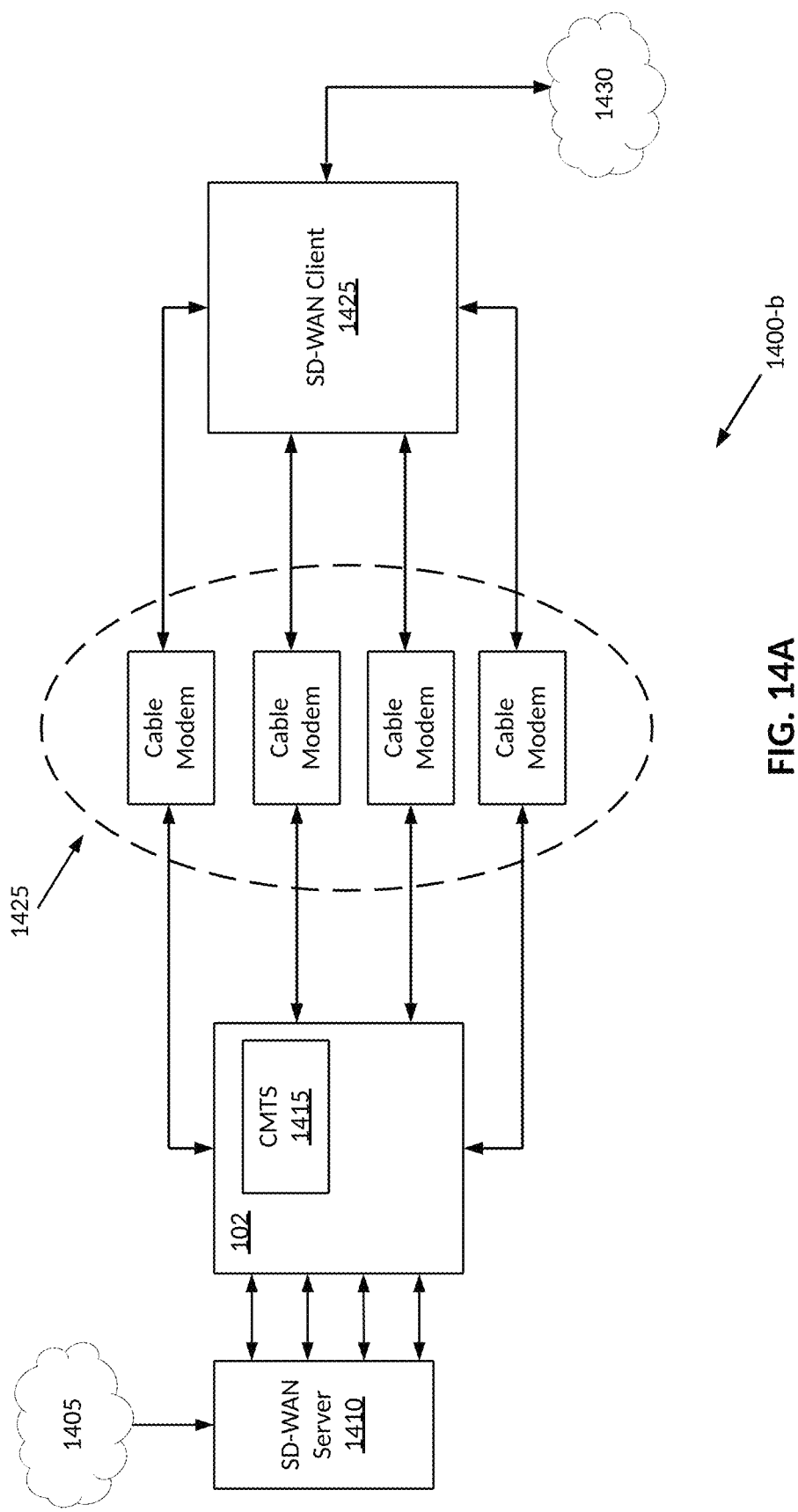
FIG. 14A and FIG. 14B depict multi-channel communications systems.
Figure 14B:
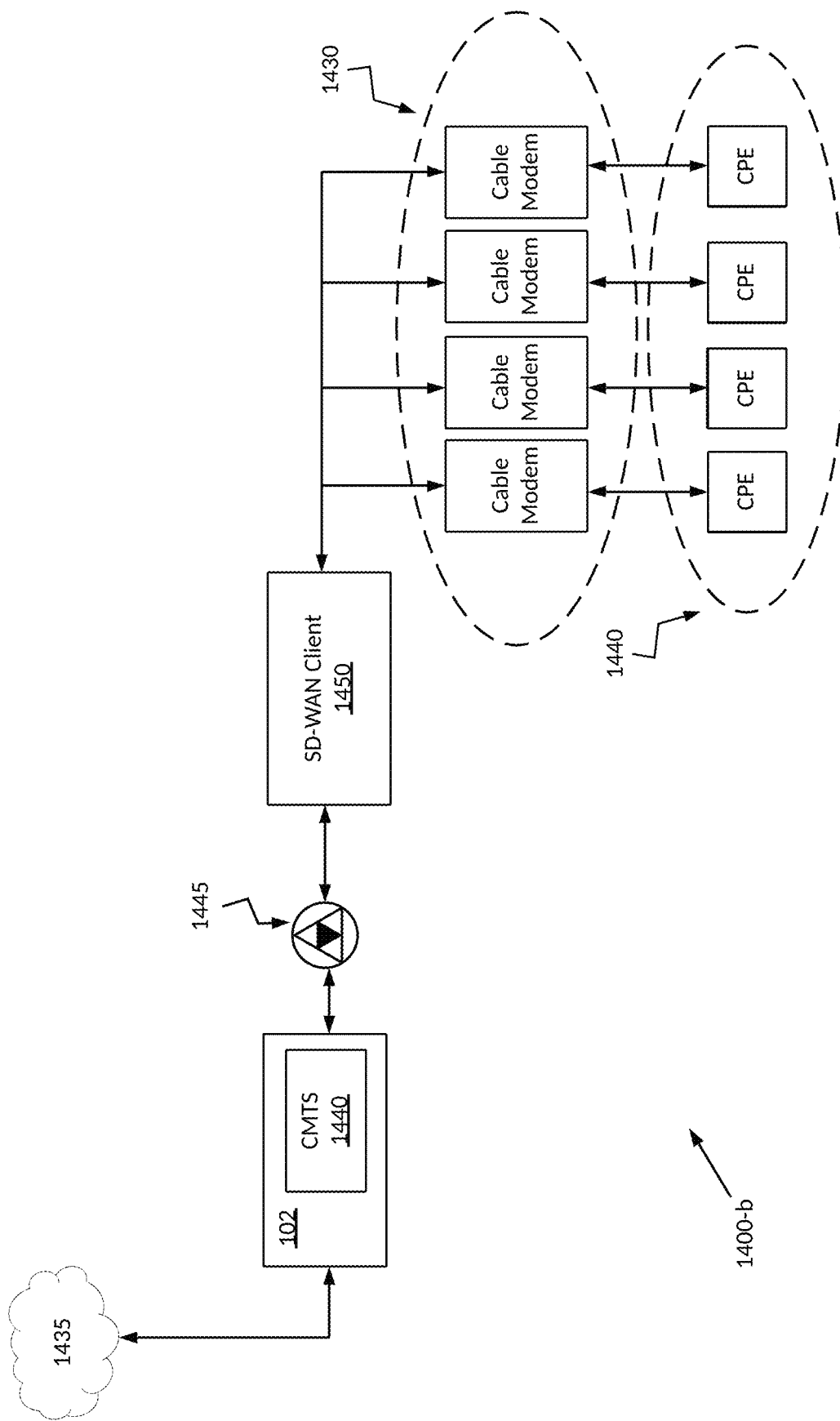
Figure 16:
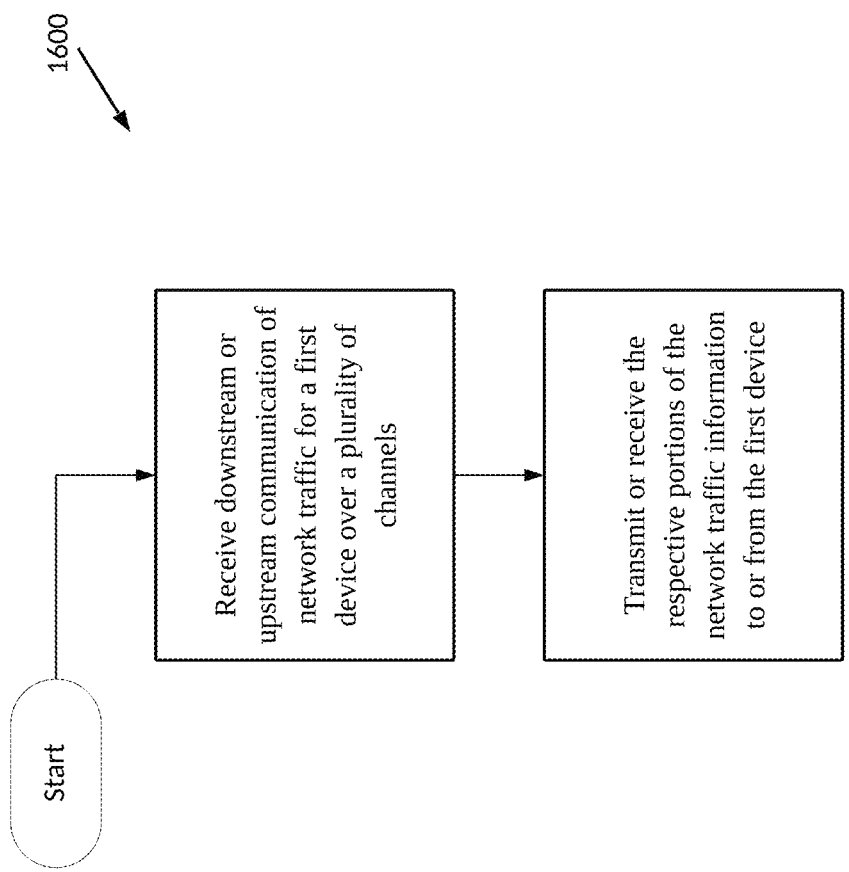

FIG. 16 depicts a flowchart illustrating a method for multi-channel communications for the multi-channel communications system depicted in FIG. 14A and FIG. 14B.

At the first step, the device may receive downstream or upstream communication of network traffic for a first device over a plurality of channels.

At the second step, the device may transmit or receive the respective portions of the network traffic information to or from the first device.

Figure 2:
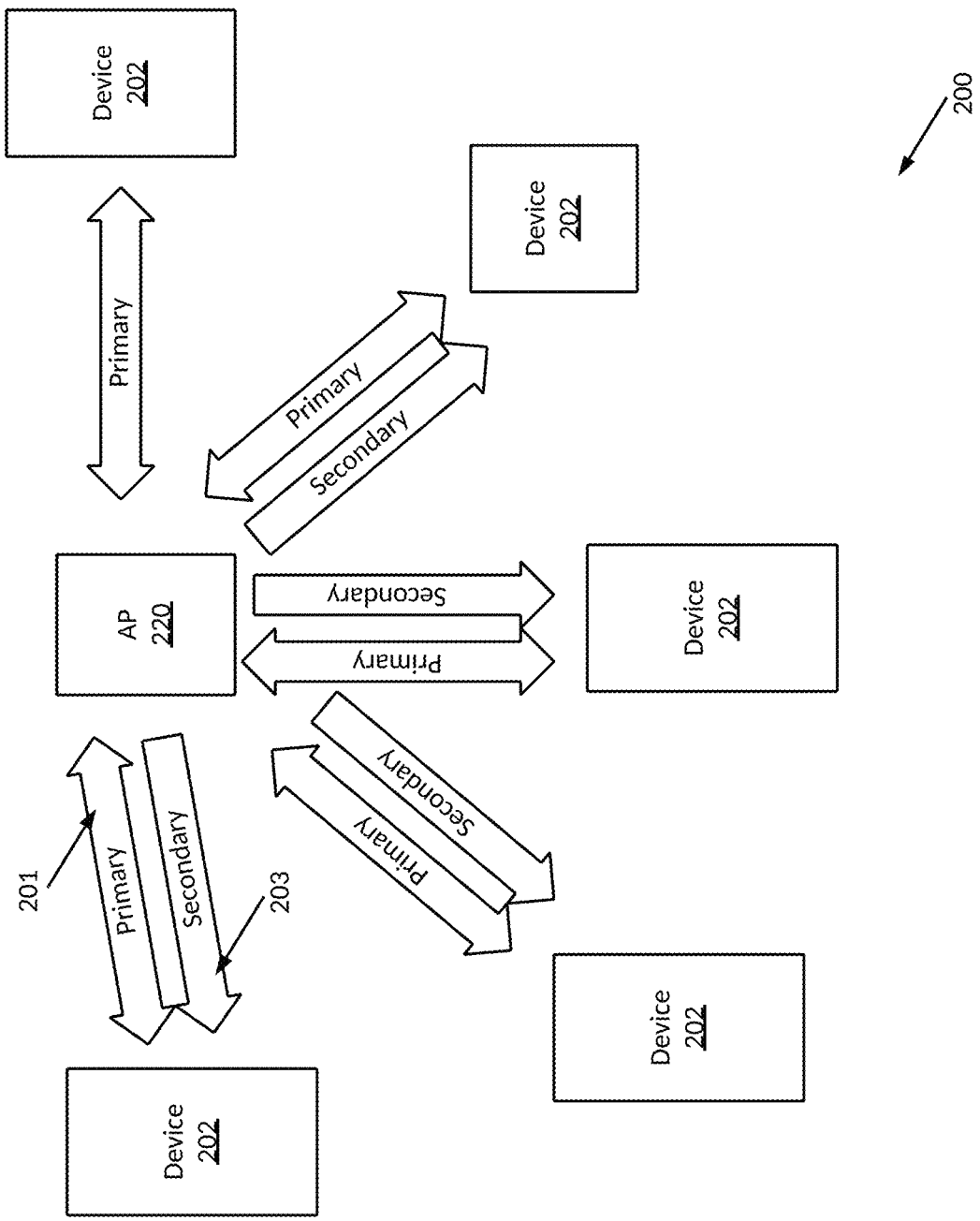
FIG. 2 depicts a multi-channel communications system as deployed in the multi-channel communications system depicted in FIG. 1.
Figure 17:
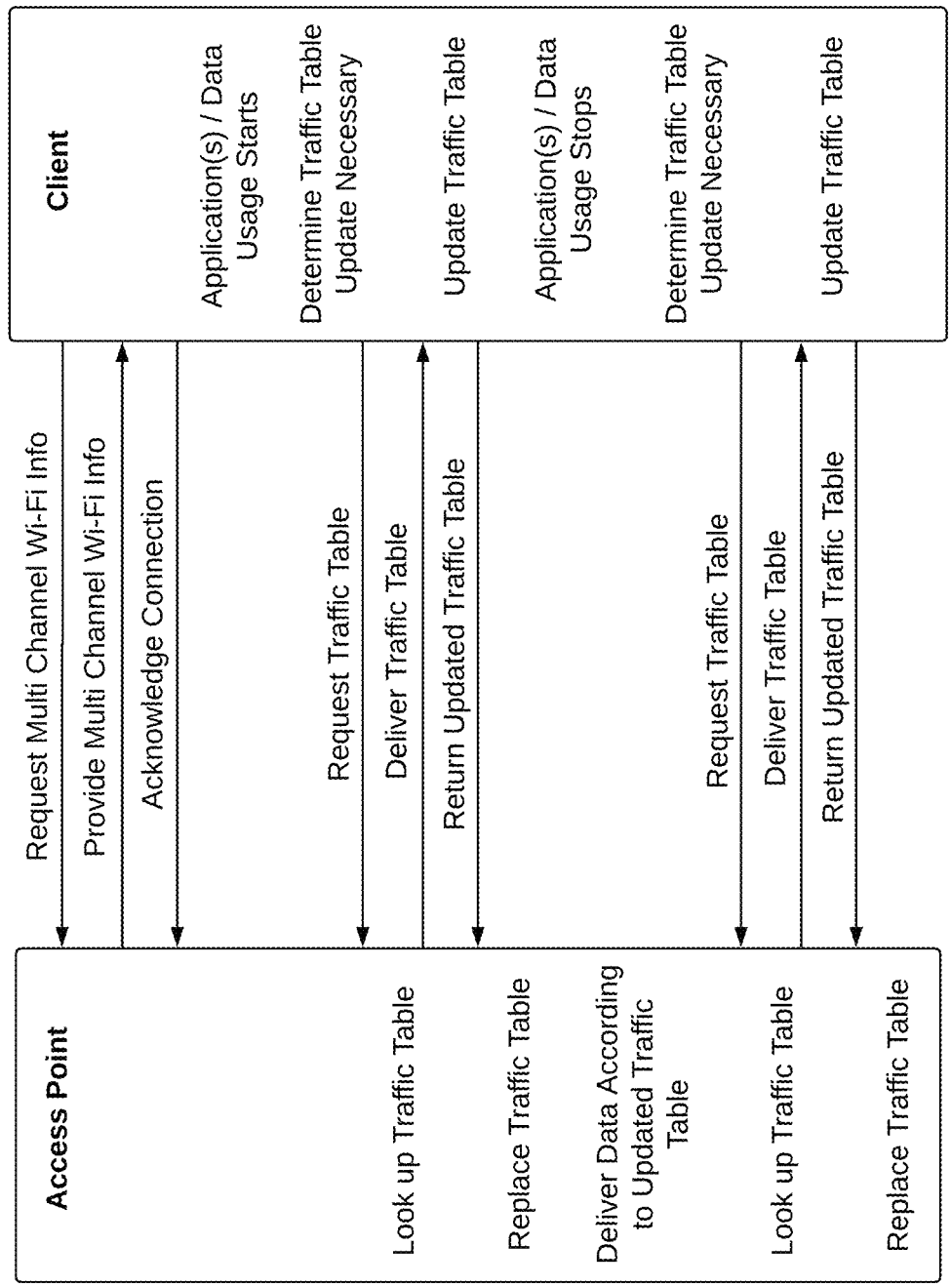

FIG. 17 depicts an access point and a device/client interfacing with network traffic for use with aspects of the multi-channel communications systems depicted in FIG. 2.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS" may refer to one or more of a cable modem termination system (CMTS), an optical line terminal (OLT), a network termination unit, a satellite termination unit, a mobile core, a converged core such as a wireless-wireline converged core, and/or other termination devices and systems. Similarly, "modem" may refer to one or more of a cable modem (CM), an optical network unit (ONU), a digital subscriber line (DSL) unit/modem, a satellite modem, eNodeB, gNodeB, etc.

As used herein, the term "coherent transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The embodiments described herein provide innovative access network architectures and processes that are useful for modifying and re-routing Ethernet and Wi-Fi traffic, thus providing relative improvements in throughput, latency, and thus power consumption and other like efficiencies. Likewise, the embodiments described herein provide innovative access network architectures and processes that allow an operator to deploy more advanced services (e.g., DOCSIS related 10G services, 3rd Generation Partnership Project (3GPP) related 5th Generation (5G) and/or New Radio (NR) services, etc.) to customers, for example, while also doing so relatively more quickly and relatively more cheaply.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. The MAC Address Remapper is a Linux kernel module which provides means of policy-based layer-2 traffic switching. Rules and filters can be defined which can rewrite the destination MAC address of matching outbound Ethernet frames; optionally the frames can be rerouted onto a different bridge interface. Filters can be configured to catch traffic as high as layer-4. Eventually it is anticipated that the MAC Address Remapper will also support load-balancing.

Figure 1:
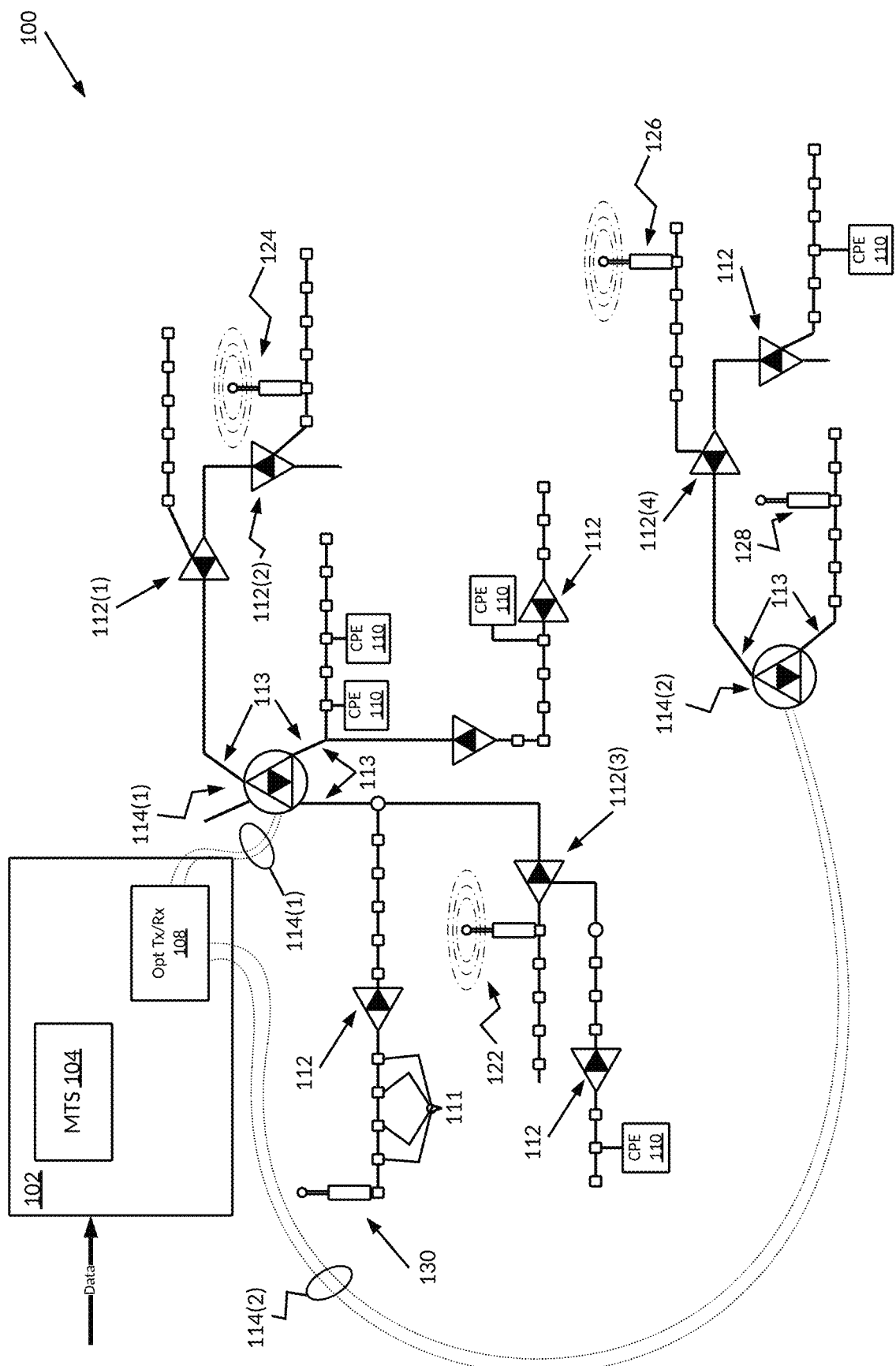
FIG. 1 depicts a multi-channel communications system.

FIG. 1 illustrates a multi-channel communications system 100 in accordance with one non-limiting aspect of the present invention. The multi-channel communications system 100 is shown as a cable communication network, but may be any communication network which may benefit from the present invention, such as a DSL network, a backhaul network for a wireless small cell network, etc.

The multi-channel communications system 100 includes a headend 102 in optical communication via optical nodes 114(1) and 114(2) of an optical transceiver 108, to fiber nodes 114(1) and 114(2), respectively. The headend 102 may also be equipped with a modem termination system (MTS) (102). Connected to fiber nodes 114 via a connection 113 (e.g., Coaxial line cables, which may be, for example, aerial or underground) may be one or more taps 111, one or more amplifiers 112, depending on the "branch" (see below). The multi-channel communications system 100 includes taps 111 connected to a number of customer premises equipment (CPE) 110 and radio frequency (RF) radio heads 122, 124, 126, and 128 (e.g., an eNodeB, gNodeB, WiFi access point (AP), a citizens band radio service (CBRS) transceiver, a modem, etc.). For simplicity and clarity of illustration, some taps 111 are shown with nothing connected to them. It will be understood that taps 111 may be connected with zero, one, or more than one CPE and/or radio head, or otherwise be in communication with it, but for clarity of illustration only a single CPE 110 or radio RF radio head 122, 124, 126, and 128 is shown in communication with each tap 111. It will also be understood that a connection to a tap 111 may be a wired connection or may be wireless, for example, in the case of a wireless tap 111.

Some branches are passive branches. Other branches are non-passive branches. Still other branches are a mix of passive and non-passive, which may be initially passive and then non-passive after an amplifier 112.

In the case of the multi-channel communications system 100, the present system and method may be implemented within or executed by a CPE 110 or a radio head 130, see FIG. 2 for more details. The following description may, in some examples, be directed to an implementation at a modem or at a device that may communicate with a modem, but it is to be understood that the techniques described herein are equally applicable to any network connected device that receives and transmits via the network, such as a radio head 130, a CPE 110, etc. Examples of radio head 130 include but are not limited to a Wi-Fi access point, an eNodeB, a gNodeB, a small cell, or the like.

The systems and methods described herein are therefore of particular advantageous use for the access network paradigm, for example, in the cable environment or other telecommunication applications, and may be implemented with respect to 4G, 5G, and 6G networks and related applications, as well as xhaul, fronthaul, backhaul, and midhaul deployments, and also for both short- and long-haul architectures.

Exemplary embodiments of multi-channel communications systems 100 and methods for digital and/or optical communication networks are described above in detail. The systems and methods of this disclosure though, are not limited to only the specific embodiments described herein, but rather, the components and/or steps of their implementation may be utilized independently and separately from other components and/or steps described herein.

The present embodiments thus realize significant improvements to signal recovery and processing of the upstream burst signals at the OLT. For efficient recovery and processing of upstream transmissions at the OLT, the OLT must be able to respond rapidly to recover the burst signals from the various ONUs within a short time duration, and then be able to reset itself for the next incoming upstream burst. In comparison with burst-mode signal recovery techniques used by direct-detection PONs, signal recovery in the coherent PON is considerably more challenging due to the greater complexity of coherent optical signals, which are modulated and multiplexed on phase, polarization, and amplitude.

The present embodiments still further overcome the unsuitability of conventional continuous-mode coherent detection and digital signal processing (DSP) used in P2P links, which are typically based on blind or feedback-type equalization techniques, and thus required too long an acquisition time to accomplish signal recovery for burst-mode detection. The present systems and methods additionally effectively address the additional challenges arising from burst-mode DSP, such as: (i) other non-DSP subsystems are required to operate at sufficient similar high speed to detect the short optical bursts; and (ii) frequency-offset estimation must be similarly sufficiently fast, and also able to withstand a large offset range due to possible laser wavelength drift.

According the embodiments described above, an innovative preamble architectural design is provided, as well as a corresponding burst-mode DSP solution, enabling significantly improved coherent upstream burst-mode detection in a 100G time-division multiplexing (TDM) coherent-passive optical networks (PONs). The above embodiments further demonstrate that these advantageous architectural and DSP function systems and methods are experimentally verified to be both reliable and efficient over a variety of different relevant test scenarios and test conditions.

The unique preamble architectural configuration described herein provides still further advantages over conventional techniques by enabling individual portions of the new preamble structure to be shared by multiple DSP functions, or functional units, thereby greatly reducing the overall preamble length. The experimental results described above further confirmed a robust performance of the present embodiments over a large frequency-offset, residual fiber dispersion, and long running times. As a proof-of-concept, a relevant testing system setup achieved effective coherent upstream burst-mode detection of a 100 Gb/s PDM-quadrature phase shift keying (QPSK) signals, with 36-decibel (dB) power budget, and after 50-kilometer (km) standard mode fiber (SMF) transmission using the present preamble architectures having a length of 71.68 nanoseconds (ns) at the transmission-side, with corresponding burst-mode DSP at the receiver-side. The present systems and methods still further demonstrated approximately 20 dB of received power dynamic range for burst signal detection in a 100-Gb/s/λ. TDM coherent-PON.

FIG. 2 depicts a multi-channel communications system 200 as deployed in the multi-channel communications system depicted in FIG. 1. The multi-channel communications system 200 may be characterized for exemplary purposes as multi-channel due to having an ability to separately or independently operate, support, configure, etc., multiple communication paths, signals, and the like, between a plurality of devices 202 (e.g., CPEs) and an AP 220. The communications may occur over a related wired and/or wireless medium(s), such as to facilitate data delivery between the plurality of devices 202 and/or between the plurality of devices 202 and devices, servers, networks, etc. located outside/upstream of the AP 220. The AP 220 may correspond with any AP, base station, node, gateway, interface, etc. positioned to facilitate exchanging signaling between one network and another and/or terminating or otherwise managing communications for a singular or unconnected network. The present invention is predominately described for exemplary non-limiting purposes with respect to the AP 220 facilitating wireless communications with the plurality of devices 202 and exchanging wireless and/or wired signaling therefrom with a service provider, such as but not necessary limited to an Internet service provider (ISP), a multiple system operator (MSO), a cellular communication provider, a cable television provider, a home network, a local area network (LAN), etc. with the AP 220 being configured in accordance with the associated provider to facilitate the signal exchange with the plurality of devices 202.

One non-limiting aspect of the present invention contemplates facilitating the multi-channel communication with AP 220 supporting a primary channel 201 and one or more secondary channels 203. The primary channel 201 may be utilized to facilitate bidirectional/half-duplex communication according to Wi-Fi, Long-Term Evolution (LTE), Ethernet, MOAC, etc., such as to facilitate upstream and downstream communication of network traffic. The secondary channel 203 may be utilized to facilitate limited half-duplex and/or non-duplex communications in so far as being limited to facilitating downstream but not upstream communication of network traffic. Collision avoidance, congestion control, carrier sense, request to send/clear to send (RTS/CTS) and other processes, such as that described in U.S. application Ser. No. 13/537,707, entitled Network Traffic Prioritization, the disclosure of which is hereby incorporated in its entirety by reference herein, may be employed to facilitate communications over the primary channels 201 and secondary channels 203. Limiting the secondary channel 203 to certain downstream communications may be beneficial in ameliorating the amount of time spent undertaking collision avoidance. This may result from the prohibition on upstream communication of network traffic essentially producing a contention-less environment that substantially eliminates a need for the APs 220 to compete with the plurality of devices 202 for resources. The AP 220 may employ some of the backoff timers and other capabilities utilized on the primary channel 201 to avoid collisions, such as to avoid collisions with neighboring APs, but those timers and factors may be comparatively shorter/less due to considerations and allocations for the plurality of devices 202 being essentially unnecessary. The ability to operate the secondary channel 203 without the additional messaging, burdens, bandwidth, etc. consumed by the primary channel 201 in thwarting collisions may be beneficial in avoiding the related loss/consumption of time, network resources, etc. Those resources may then be used to instead improve throughput, quality of service (QOS), packet loss, reliability, etc. for the secondary channel 203 in comparison to the primary channel 201 (e.g., freeing additional capabilities of the secondary channel 203 to facilitate data delivery instead of managing network communications).

The primary channel 201 may operate over one frequency or multiple and/or ranges of frequencies separate from or otherwise differentiated from frequencies of the secondary channel 203, for example, the same frequencies may be utilized by both the primary channel 201 and secondary channel 203 at different times and/or the utilized frequencies may change over time. The different channels may be utilized to facilitate simultaneously carrying data between the AP 220 and the same one and/or different ones of the plurality of devices 202, for example, the AP 220 may facilitate half-duplex communications over the primary channel 201 while simultaneously transmitting downstream over the secondary channel 203. One non-limiting aspect of the present invention contemplates distinguishing network traffic from non-network traffic, such as according to whether the attendant communications are considered within the Open Systems Interconnection model (OSI model) to be layer-2 or data link layer traffic, which may be considered non-network traffic, or layer-4 or transport layer traffic, which may be considered to be network traffic. The differentiation of layer-2 and layer-4 communications, respectively referred to as non-network traffic and network traffic, may be optionally determined according to addressing associated with packets, frames, and the like, being communicated, for example, using source and destination addresses for layer-2 communications may be devoid of Internet protocol (IP) addresses and instead utilize media access control (MAC) addresses whereas source and destination addresses for layer-4 communications may utilize IP addresses. The layer-2 or non-network traffic may be in the form of layer-2 acknowledgements required by the layer-2 protocol that is used on the channel.

Figure 3:
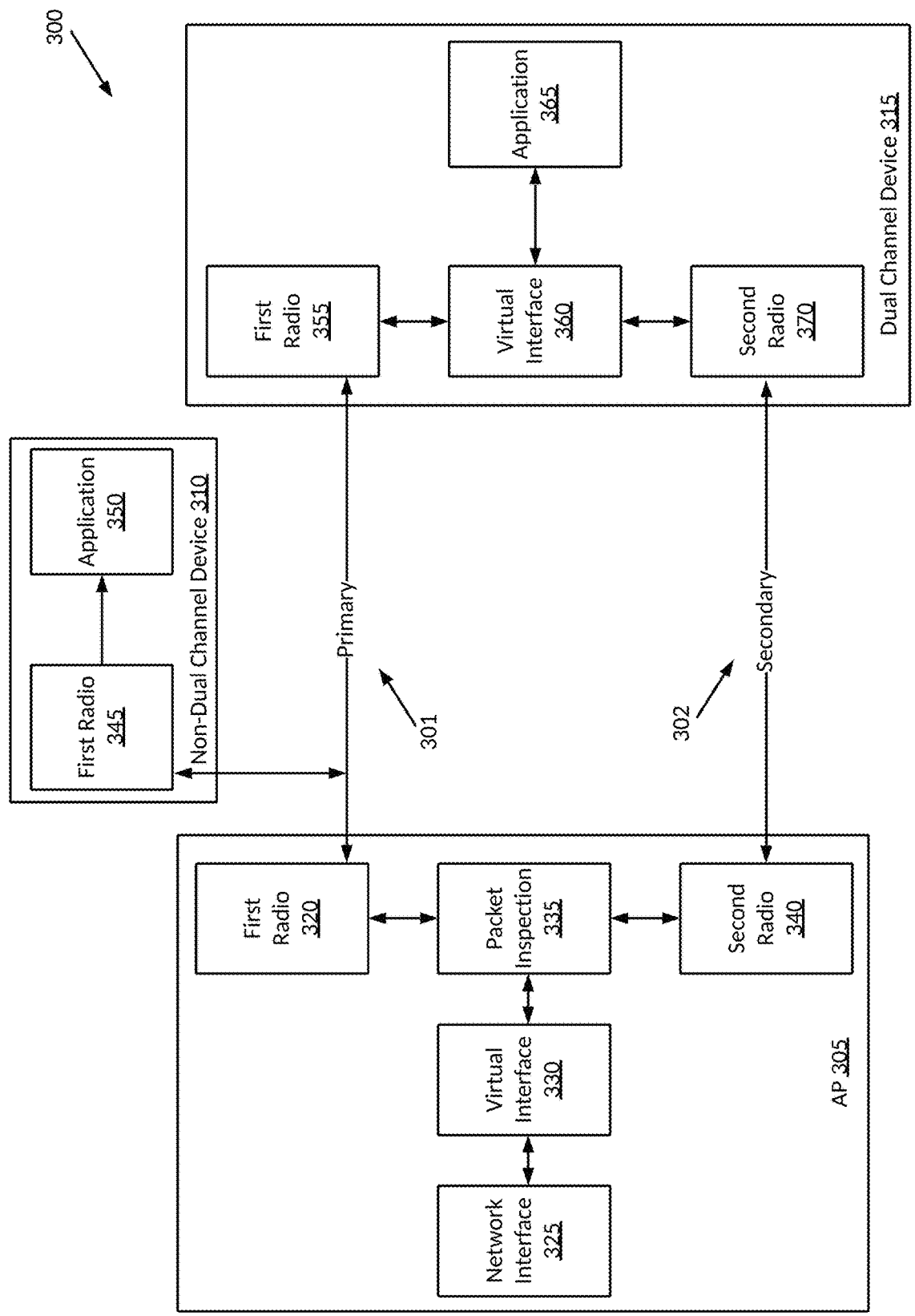
FIG. 3 depicts a functional diagram of the multi-channel communications system depicted in FIG. 2.

FIG. 3 depicts a functional diagram 300 of the multi-channel communications system depicted in FIG. 2. A first device 310 is shown for exemplary purposes to correspond with a non-dual channel device and the second device 315 is shown to correspond with a dual channel device. The AP, first device 310 and the second device 315 are described for exemplary purposes with respect to facilitating wireless (e.g., Wi-Fi) communications in accordance with the Institute of Electrical and Electronics Engineers (IEEE) 802.11: Telecommunications and information exchange between systems—Local and metropolitan area networks—Specific requirements-Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. Each of the AP, the first device 310, and the second device 315 may include a non-transitory computer-readable medium having a plurality of non-transitory instructions stored thereon and executable with an included processor (not shown) to facilitate some or all of the operations contemplated herein. Each of the AP 305, the first device 310, and the second device 315 are shown with respect to designators (e.g., rectangles) for illustrative purposes of representing hardware, software or other capabilities according to its attendant functionality.

The AP 305 is shown to include a network interface 325, a virtual interface 330, a packet inspection feature 335 and separate radios for facilitating communications with the devices 310 and 315, which for exemplary purposes are predominately described with respect to being packet-based communications, such as those associated with User Datagram Protocol (UDP) and Transmission Control Protocol (TCP). The network interface 325 may include input/output components sufficient to facilitate wiredly and/or wirelessly exchanging packets with a wide area network (WAN) or other network/device in communication therewith. The virtual interface 330 may provide an application interface for obfuscating interactions between the network interface 325 and the packet inspection feature 335, such as to enable an application to communicate packets therebetween. The packet inspection feature may include a buffer and/or other constructs to facilitate processing of the packets being exchanged through the AP 305, such as to facilitate the multi-channel communications contemplated herein. The packet inspection feature 335 is shown to facilitate exchanging packets between a first radio 320 and a second radio 340 of the AP 305, and optionally additional radios on the AP 305 if available. The first radio 320 may include capabilities for exchanging packets over the primary channel 301, and the second radio 340 may include similar capabilities for exchanging packets over the secondary channel 302. The packet inspection feature 335 may be operable to facilitate multiplexing (upstream) and demultiplexing (downstream) the corresponding packets relative to the network interface to enable the network interface to exchange the packets in a common transport stream. The packet inspection feature 335 may determine the radio to which a packet should be sent based on predefined filter settings when packets are destined for the dual channel device 315. As shown herein for exemplary purposes, the other illustrative components of the AP 305 may additionally or alternatively be implemented through other elements, for example, the virtual interface 330 may be sufficient to facilitate exchanging packets between the network interface 325 and the different radios.

The non-dual channel device 310 is shown to include a first radio 345 for exchanging packets with an application 350 intending to make use thereof. The non-dual channel device 310 is shown for exemplary purposes as being a non-dual channel device 310, which for illustrative purposes is assumed to lack a second radio or a radio capable of communicating with the second radio 340 of the AP 305, e.g., the non-dual channel device 310 may include a second radio but only one radio having capabilities sufficient to operate at frequencies utilized by the first and second radios of the AP 305. The dual channel device 315 is shown to include a first radio 355 and a second radio 370 for exchanging packets with a virtual interface 360 suitable for interacting with an application 365 which the dual channel device 315 may intend to use. The first radio 355 and the second radio 370 may correspond with the first radio 320 and the second radio 340 of the AP 305 and/or include capabilities commensurate with the first radio 320 and the second radios 340 of the AP 305 to facilitate exchanging packets therewith. The virtual interface 360 may be an application layer construct or logical element capable of facilitating processing of exchange packets between the first and second radios in a manner obfuscated to the application 365 so as to enable the application 365 to process exchanged packets without regard to whether the packets have been or will be exchanged through the first or second radios. For example, in a downstream direction, the application 365 may receive packets from the virtual interface 360 without identifying the radio from which the application 365 received the packets. Likewise, in an upstream direction, the application 365 may transmit packets to the virtual interface 360 without identifying the radio with which the virtual interface 360 is to transmit the packets to the AP 305.

Figure 4:
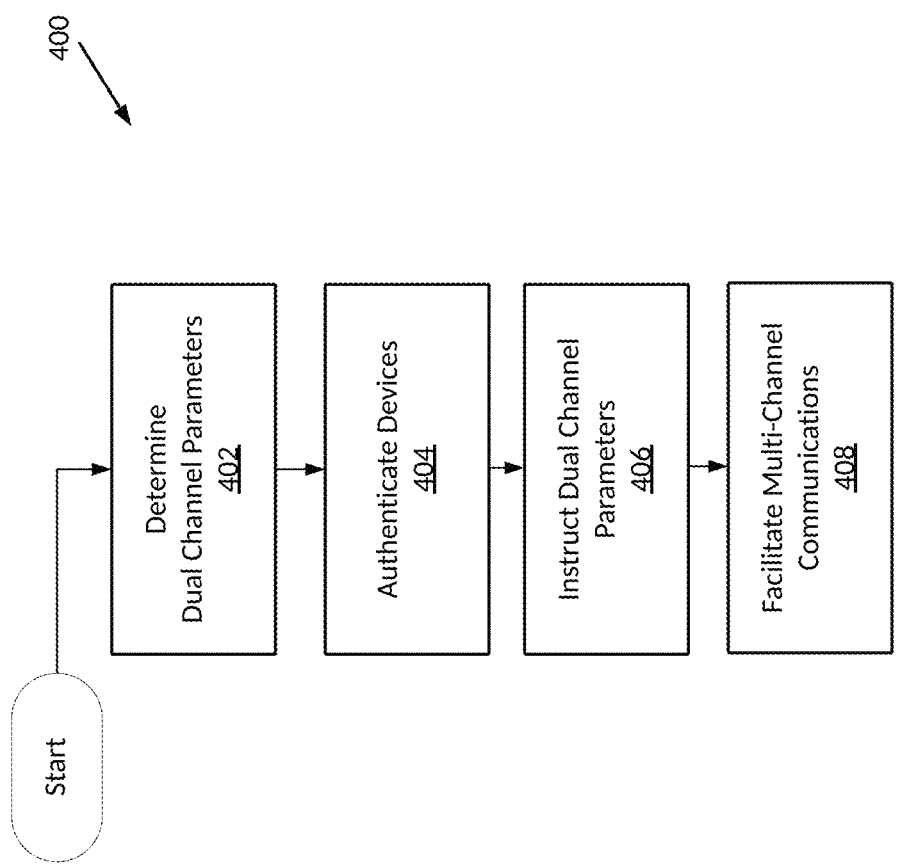
FIG. 4 depicts a flowchart illustrating a method for multi-channel communications for the multi-channel communications system depicted in FIG. 2.

FIG. 4 depicts a flowchart illustrating a method 400 for multi-channel communications for the multi-channel communications system depicted in FIG. 2. The method 400 may be beneficial when any number of channels are utilized to facilitate wired and/or wireless communications. The method 400 is predominately described for exemplary purposes with respect to environments where two wireless channels may be utilized for communications between an AP and one or more devices, such as in the multi-channel communications systems described herein. Block 402 relates to determining dual channel parameters in accordance with the present disclosure to facilitate multi-channel communications. The parameters may be determined to facilitate selectively controlling communications permitted over certain channels in order to maximize efficiency, throughput or other operational characteristics. One non-limiting aspect of the method contemplates selectively controlling the types of communications permitted over a primary channel and a secondary channel in a dual channel environment, for example, permitting certain types of communications over one of the channels but not the other one of the channels. Disparately controlling the communications permitted over each of the channels may be beneficial in maximizing performance and improving performance in comparison to dual channel environments where the types of communications permitted over each channel are not similarly controlled, for example, when both channels are permitted to engage in the same types of communications.

The ability of the present invention to selectively control particular types of communications permitted over the primary channel and the secondary channel may be beneficial in achieving heightened performance through amelioration of the amount of time collectively spent by the AP and the devices contending for access to the secondary channel. Limiting the secondary channel to facilitate download of certain types of communications, for example, can free the secondary channel to more quickly transmit the corresponding data than it would otherwise be able to do in the event corresponding transmissions were controlled in a manner identical to or commensurate with the primary channel, e.g., using the same contention time and/or processes utilized over the primary channel. One non-limiting aspect of the present invention contemplates selectively controlling communications permitted over the primary channel and the secondary channel by permitting the primary channel to support upstream and downstream transmission of network traffic while limiting the secondary channel to only downstream transmission of network traffic. The contemplated network traffic may be used to characterize virtually any type of data transmission differentiated from non-network traffic. The non-network traffic may be characterized as radio acknowledgments or other layer-2 or data link layer traffic necessary to facilitate certain types of wireless communications, such as those compliant with the above-referenced Wi-Fi specifications. The non-network traffic may be optionally characterized as that associated with packets, frames or other messages transmitted to confirm delivery of data (network traffic) without being dependent on assessing or otherwise interpreting contents or information within the data being confirmed.

The network traffic may correspond with layer-4 or transport layer traffic/communications utilized to facilitate transmission of data intended to be processed by an application, including attendant network acknowledgments and other confirmations utilized to apprise the related applications of communication statuses. The network traffic may be communicated according to TCP whereby buffers or other devices/applications processing TCP packets (network traffic) transmit responsive network acknowledgments (network traffic) at a fixed frequency or on a sliding scale. For example, the rate/frequency of network acknowledgments may vary depending on the success of packet deliveries. The device transmitting the network acknowledgments (network traffic) to confirm receipt of TCP packets or other packets may additionally transmit radio acknowledgments (non-network traffic) depending on its particular configuration, for example, a radio or other interface processing the network traffic may be configured to issue radio acknowledgments (non-network traffic) depending on receipt of layer-2 frames being used to carry the desired transmission (network traffic). The radio acknowledgments may be issued in addition to the network acknowledgments due to layer-2 related protocols requiring a corresponding radio interface to acknowledge frame receipt and layer-4 related protocols requiring a corresponding application utilizing the TCP packets or other data included within the layer-2 frames to acknowledge corresponding processing thereof. The frequency of the radio acknowledgments may differ from the frequency of the network acknowledgments depending on protocols and/or other operating parameters.

Figure 5:
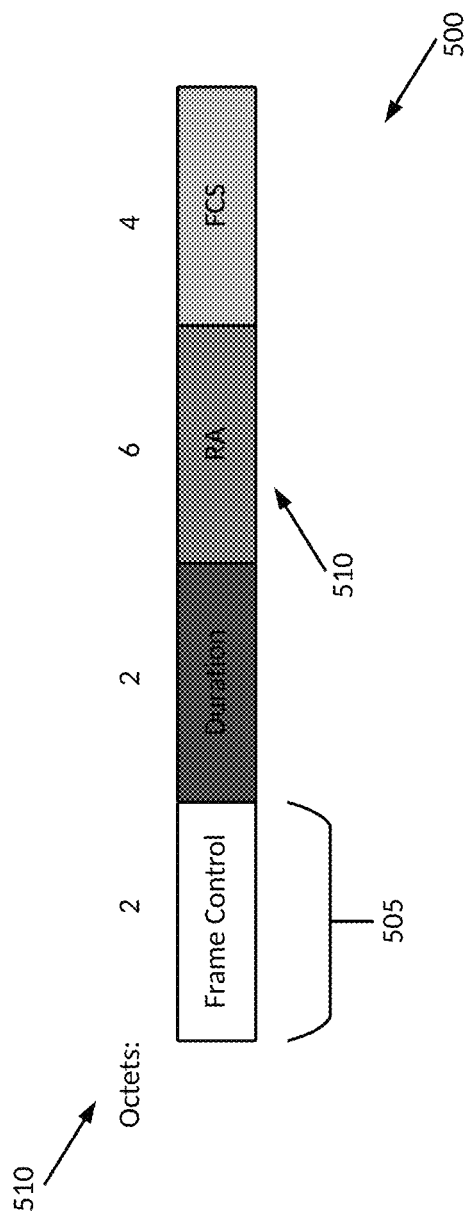
FIG. 5 depicts a radio acknowledgment for the method for multi-channel communications depicted in FIG. 4.
Figure 6:
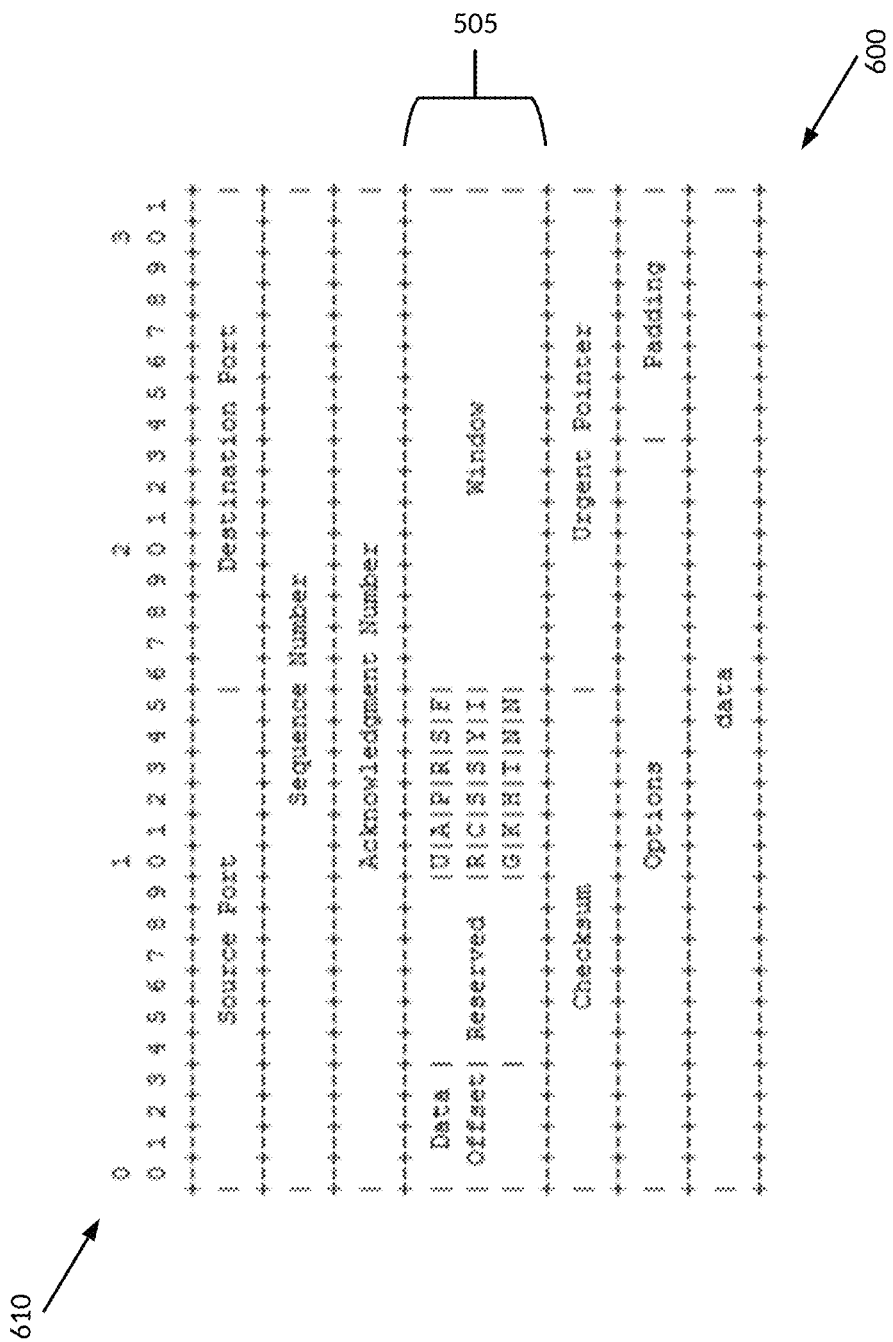
FIG. 6 depicts a networking acknowledgment for the method for multi-channel communications depicted in FIG. 4.

FIG. 5 depicts a radio acknowledgment 500 for the method for multi-channel communications depicted in FIG. 4. FIG. 6 depicts a networking acknowledgment 600 for the method for multi-channel communications depicted in FIG. 4. The radio acknowledgment 500 and the network acknowledgment 600 are presented for exemplary purposes to illustrate differences between acknowledgments considered as non-network traffic (e.g., radio acknowledgments 500) and acknowledgments considered as network traffic (e.g., network acknowledgments 600). The radio acknowledgment 500 is illustrated in accordance with IEEE specification 802.11-2012 and the network acknowledgment 600 is illustrated in accordance with the TCP suite of protocols. The radio acknowledgment 500 may be slavishly generated without assessing information/data included within a corresponding payload and may be smaller than the network acknowledgment. A number of octets 510 and 610, as shown with respect to FIGS. 5 and 6, respectively, may be defined for the radio acknowledgment (RA) 500 and/or the networking acknowledgment 600, where octets 510/610 may carry corresponding numbers of information bits to convey particular information designated (or left open) for the field 505 (or subfield). An RA field 510 of the ACK frame may copied from the Address 2 field of the immediately previous individually addressed data, management, BlockAckReq, BlockAck, and/or PS-Poll frames, i.e., a MAC address included within a layer-2 frame triggering the radio acknowledgment 500. The remaining fields 505 in the radio acknowledgment 500 may be devoid of or otherwise omit IP addresses, for example, the IP addresses may instead be implemented at or within a source port field and/or a destination port field of the network acknowledgment 600. Detail regarding the nature of the additional fields 505 illustrated in FIGS. 5 and 6 may be found in the corresponding documentation of the related specification and protocol, the disclosures of which are hereby incorporated by reference in their entireties.

In addition or alternatively to determining differences or characterizations sufficient for differentiating network traffic from non-network traffic, the dual channel parameters may also be determined to facilitate implementing a filter sufficient for filtering the network traffic and/or the non-network traffic at the AP and/or the devices. The corresponding parameters may be used to set filter rules and/or filter variables for packet size, destination ports, protocol, tags or a combination of these or other variables. The filter variables and/or filter rules may be utilized by the virtual interfaces and/or the packet inspection features to facilitate processing communications and/or otherwise generating routing tables or procedures for communicating over the primary and secondary channels in the contemplated manner. One nonlimiting aspect of the present invention contemplates utilizing the filter to facilitate processing necessary to determine whether data being transmitted between the AP and the devices should be communicated over the primary channel or the secondary channel. At least with respect to the dual channel devices, the filter can be utilized by the AP to facilitate selecting one and/or both of the primary and secondary channels to facilitate downstream transmissions to the individual devices.

The filter may implement corresponding results depending on whether a metric for the filter variables exceeds a corresponding threshold, for example, one or more of: (1) destination port/addresses to determine whether communications are destined for a dual channel or non-dual channel device, e.g., to direct all communications over the primary channel for non-dual channel devices; (2) packet size to direct packet sizes exceeding a threshold over the secondary channel; (3) protocol/data type to default particular protocol/data types to the secondary channel and others to the primary channel; (4) network performance characteristics reflective of overall network performance, i.e. network throughput measured from combining performance of both the primary and secondary channels, to determine whether communications should be directed over the primary or secondary channel, e.g., to transmit entirety of communications over the selected one of the primary and secondary channels and/or to partition communications, i.e. transport streams of packet flows, destined for one device over both of the primary and secondary channels e.g., to facilitate partially transmitting communications over both of the primary and second channels to a particular device; and/or (5) using content type, such as for identifying video data, music data, or other data where large volumes of data need to be moved, to route higher throughput dependent content types over the secondary channel. The filter may use these variables to generate rules and tests for generating corresponding results, such as a first result when appropriate to communicate over the primary channel and a second result when appropriate to communicate over the secondary channel.

Block 404 relates to authenticating the devices for communications with the AP. The authentication process may include the AP comparing AP radio capabilities relative to device radio capabilities for purposes of assessing whether the devices should be considered as dual channel or non-dual channel devices. In the event the AP utilizes 2.4 gigahertz (GHz) for the primary channel and 5.0 GHz for the secondary channel, the authentication process may include the AP determining whether the devices include capabilities for supporting 2.4 GHz and 5.0 GHz frequency bands. This authentication process may further include assessing additional radios and capabilities of the AP and the devices, such as to determine whether the device can support additional frequencies, e.g., 60 GHz, for purposes of facilitating communications over a tertiary channel or more channels. The additional channels beyond the primary and secondary channels may optionally operate in an identical manner to the secondary channel (aside from different frequency ranges) and/or further filters may be applied thereto to control channel routing, e.g., the secondary channel may be utilized for one type of content, such as voice data, and the tertiary channel operating at a higher frequency and/or throughput may be utilized for another type of content, such as more volume dependent content like video data.

The authentication process may optionally include processes for facilitating communications according to Access Network Query Protocol (ANQP), including use of an ANQP vendor specific field to communicate to the AP if a device can support the dual band functionality. ANQP responses may be utilized to include information from the AP as to the secondary channel to be used, such as a service set identifier (SSID) and access method to be used. The AP may optionally use these capabilities to allow the secondary channel to be a "hidden" SSID and make use of access methods that would not need to be publicly known, which may be beneficial in thwarting snooping or packet monitoring in the event the secondary channel facilitates communication of data design enhanced security. At any time, any associated device that supports the dual band could be signaled by the AP again using ANQP messages to switch between one of a plurality of sub-channels within the secondary channel, i.e., the secondary channel may include multiple sub-channels at different sub-frequencies associated with the corresponding frequency band. These would allow the AP to selectively put various devices on different secondary channels, which could be done as a result of new traffic being sent to devices producing a need to balance out the traffic flow on each available secondary channel.

Block 406 relates to the AP instructing the devices with respect to the relevant dual channel parameters. Corresponding instructions may include providing the devices one or more SSIDs depending on whether the devices are able to facilitate communications over one or both of the primary and secondary channels, filtering or routing instructions for upstream and/or downstream communications and other operating instructions necessary to facilitate the operations contemplated herein. The instructions may optionally be utilized to facilitate configuring the virtual interface of the devices to provide an automated mechanism for processing downstream communications received over either one of the radios and to facilitate upstream communications over either one of the radios. One non-limiting aspect of the present invention contemplates instructing the devices to limit certain types of communications being communicated upstream over the secondary channel to ameliorate contention time and other time spent arbitrating access to the secondary channel. The limitations placed upon communications over the secondary channel may be implemented so that all network traffic communications occur over the primary channel, thereby freeing the secondary channel to maximize capabilities for supporting downstream communications. The devices may be instructed in this manner to transmit some upstream, non-network traffic communications over the secondary channel, such as to enable radio acknowledgments, and to transmit all other upstream network traffic, such as network acknowledgments and transport streams originating at the devices, solely over the primary channel.

Block 408 relates to facilitating multi-channel communications in the manner contemplated by the present invention to enable maximization of communication capabilities within a networking environment employing the primary and secondary channels and/or additional channels. One non-limiting aspect of the present invention contemplates utilizing the dual channel parameters and the processes for authenticating and instructing the devices to produce a networking architecture whereby the AP may be able to selectively determine communications for transmission over the primary and secondary channels, such as to prevent the devices from communicating anything but non-network traffic upstream over the secondary channel for purposes of freeing the secondary channel from contention or access restraints associated with the primary channel, which may then enable the secondary channel to be used to maximize throughput for communications occurring downstream over the secondary channel. The restriction on the devices from transmitting certain communications upstream over the secondary channel may be sufficient to allow the AP to effectively arbitrate all communications over the secondary channel without having to take into consideration upstream communication requests of the devices. The radio acknowledgments may be of such a nature that their transmission upstream over the secondary channel can be considered as insufficient or irrelevant in so far as affecting contention or access processes used to govern use of the secondary channel, at least with respect to how the corresponding metrics are used to govern access to the primary channel.

The multi-channel communications may be facilitated in accordance with the present invention by freeing the secondary channel from the contention or usage constraints otherwise employed on the primary channel. The resulting effect may be to enable the AP with capabilities to selectively control the transmission of downstream communications over the secondary channel without having to consume or delay use of airtime or other network resources for purposes of assessing whether any upstream communications are likely to collide therewith or otherwise adversely affect the communication thereof. One non-limiting aspect of the present invention particularly contemplates maximizing capabilities of the AP to utilize a secondary channel in an efficient manner by requiring the devices to transmit any acknowledgments but the radio acknowledgments over the primary channel regardless of whether the attendant communications were provided thereto over the primary or secondary channel. The AP may instruct and/or the devices may be otherwise controlled, such as through the filter parameters or routing tables, to prevent transmitting network traffic upstream over the secondary channel. One non-limiting aspect of the present invention contemplates the virtual interfaces of the devices and the AP being obfuscated from the applications employing the use thereof such that the applications are unaware of the radio being used to transmit upstream/downstream communications, which through the noted programming thereof, enables use of the secondary channels for downstream network traffic and prevents the use thereof for network traffic, i.e., the filters, routing tables, etc. may be utilized to facilitate enabling and disabling/preventing communications over the primary and secondary channels.

As supported above, one non-limiting aspect of the present invention relates to a Dual Channel Wi-Fi implementation for making use of two or more wireless or wired channels/paths for the delivery of data to endpoints, which may be utilized to create two or more separate non-conflicting paths of data delivery. In the case of Wi-Fi only devices, two or more Wi-Fi channels may be employed with one of the channels used as a primary channel and the remaining channels used for downstream only data transport. The focus of the Dual Channel Wi-Fi could be used over any combination of data transport mediums ranging from Wi-Fi and LTE to Ethernet and MOAC. The primary path or channel may operate in a normal fashion allowing both Dual Channel capable devices and legacy devices to communicate with no impact to current implementations. Dual Channel enabled devices may make use of a second or more paths or channels strictly for the downstream of classified data/ traffic. One aspect of the Dual Channel operation may be to allow the downstream source the full availability of the downstream paths without having to contend for a transmit opportunity, which may be accomplished by using an unused or lightly used path/channel for downstream while normal traffic exchange is done over the primary path/channel. Through an exchange of control messages with the AP or Router, the device can setup the downstream only path/ channel that the AP may, based on preconfigured filtering rules, direct downstream data either on the primary path/ channel or the downstream path/channel. All upstream data may be limited/sent on the primary path/channel to enable the AP or router full time access to the downstream path/ channel without the delays resulting from upstream data and/or related collisions with downstream data.

Figure 7:
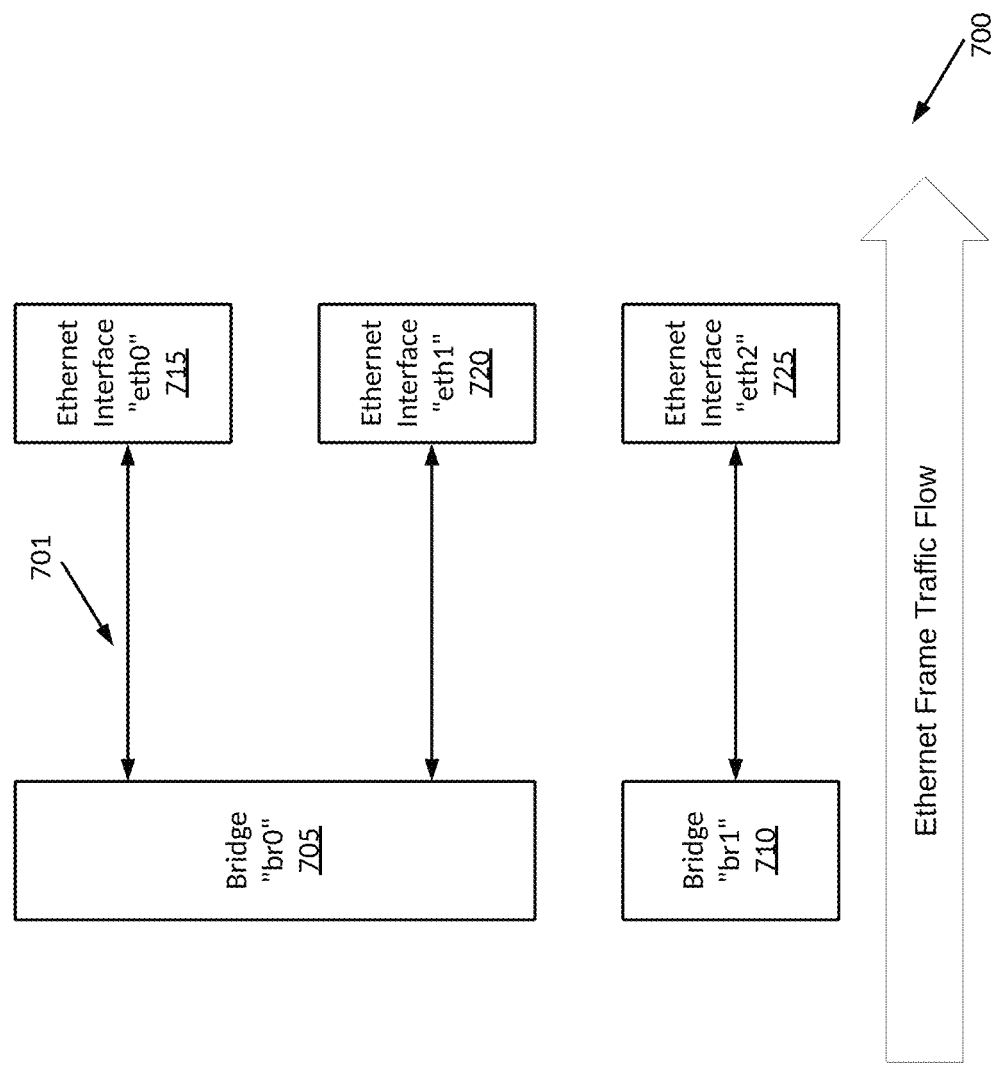
FIG. 7 depicts a multi-channel communications system interfacing with network traffic for use with aspects of the multi-channel communications systems depicted in FIG. 2.

FIG. 7 depicts a multi-channel communications system 700 interfacing with network traffic 701 for use with aspects of the multi-channel communications systems depicted in FIG. 2. The multi-channel communications system 700 may include a first bridge 705 (e.g., "br0"), a second bridge 710 (e.g., "br1"), a first Ethernet interface 715 (e.g., "eth0")," a second Ethernet interface 720 (e.g., "eth1")," and a third Ethernet interface 725 (e.g., "eth2")."

An address remapper is a Linux kernel module which provides means of policy-based layer-2 traffic switching. In some examples, rules and/or filters may be defined that can rewrite a destination address (e.g., a destination MAC address) of matching outbound Ethernet frames. In some examples, the frames can be rerouted onto a different bridge interface in this way. Filters may be configured to catch traffic 701 as high as layer-4. In some examples, an address remapper (e.g., a MAC address remapper) may also support load balancing. The address remapper may be implemented according to various projects or guidelines, for example, being designed to meet the needs of the Dual-Channel Wi-Fi project. With Dual-Channel Wi-Fi, a single network endpoint can have multiple Ethernet/Wi-Fi MAC addresses intended to be used with a single layer-3 (IPv4/IPv6) address.

In another example, a Dual-Channel Wi-Fi client may have two Ethernet/Wi-Fi interfaces (e.g., eth0 and eth1), but only one IP (192.168.1.100) interface. Traffic 701 destined for 192.168.1.100 may be transported either via eth0 or eth1 at a Dual-Channel Wi-Fi router's discretion. The address remapper is used in the Dual-Channel Wi-Fi Router to route the Ethernet frames to the Dual-Channel Wi-Fi client. Linux "ebtables" tools have been explored as a means of implementing this purpose, but these tools do not provide functionality required for this application. For example, the "ebtables" tools may provide only limited layer-3-level filtering whereas a MAC address remapper may provide the ability to statically filter frames as high as layer-4 (e.g. TCP/UDP). In addition to the higher-layer filtering, another requirement for this application is load balancing. When a client uses several Ethernet/Wi-Fi interfaces, a load-balancing policy and implementation will be required to process traffic 701 destined for these endpoints. In some examples, an address mapper (e.g., a MAC address mapper) may be implemented such that the address mapper may implement load-balancing in the future, if not yet able. Implementations for the address remapper may be based on a corresponding Linux bridge. The Linux bridge is a standard Linux feature which enables a Linux kernel to act as an Ethernet bridge/ switch by bridging together one or more configured Ethernet interfaces (which may be referred to as, e.g., "ports"). In some examples, the address remapper may use a netfilter hook to tie into the Linux bridge to capture network traffic 701 as the traffic 701 leaves the bridge. With a typical Linux bridge setup, each bridge interface may transmit directly out of one or more corresponding port interface(s) connected to the network corresponding to a frame for the transmission.

As shown in the example of FIG. 7, the second bridge (br1) 710 may have one port: the third ethernet interface (eth2) 725.

Figure 8:
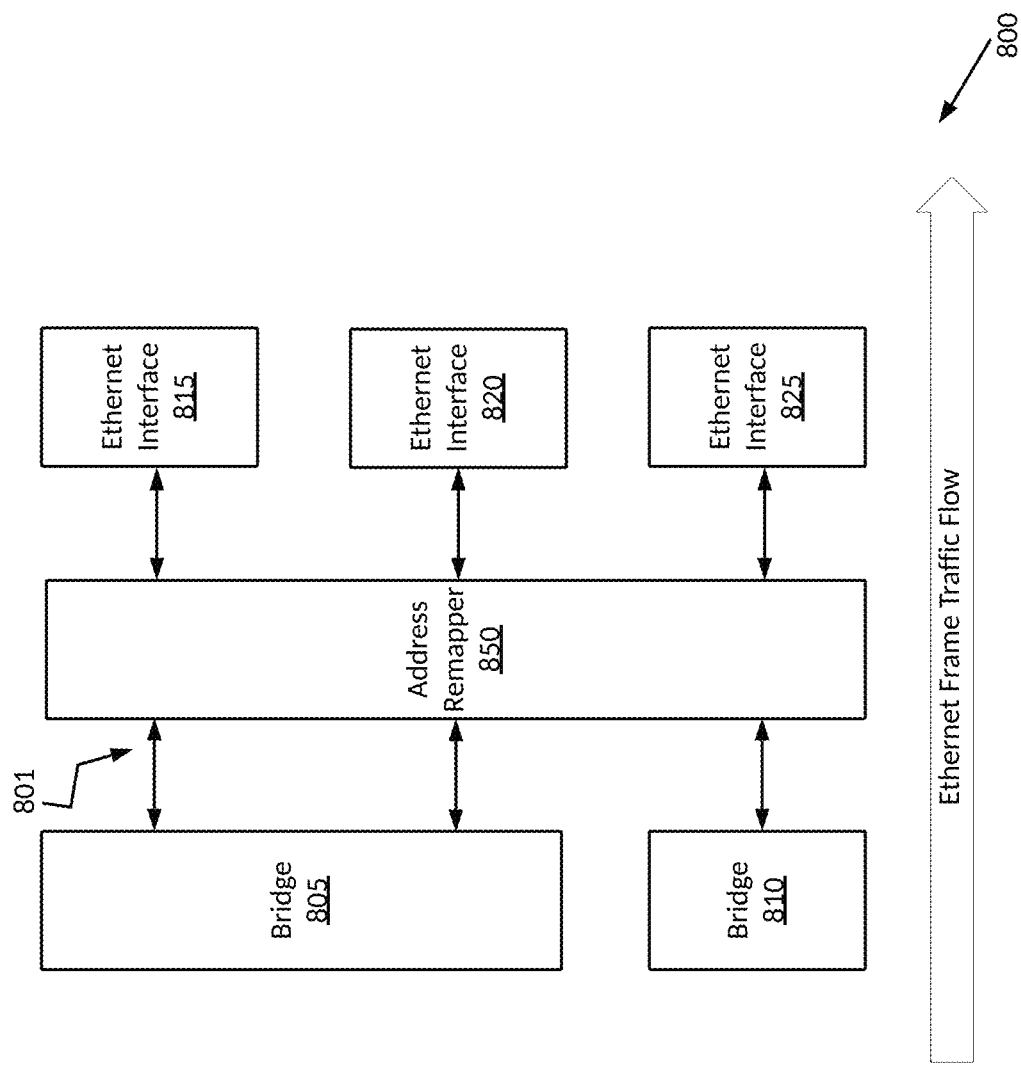
FIG. 8 depicts a multi-channel communications system including an address remapper interfacing with network traffic for use with aspects of the multi-channel communications systems depicted in FIG. 2.

FIG. 8 depicts a multi-channel communications system 800 including an address remapper 850 interfacing with network traffic 801 for use with aspects of the multi-channel communications systems depicted in FIG. 2. In the above example, outbound Ethernet traffic 801 may flow from left to right. The multi-channel communications system 800 may include a first bridge 805 (e.g., "br0"), a second bridge 810 (e.g., "br0"), a first ethernet interface 815 (e.g., "eth0"), a second ethernet interface 820 (e.g., "eth1"), and a third ethernet interface 825 (e.g., "eth2"). In the multi-channel communications system 800, outbound traffic may leave the first bridge 805 and travel directly to the first ethernet interface 815, the second ethernet interface 820, or both. Outbound traffic leaving the second bridge 810 may go directly out via the second ethernet interface 820. When the address remapper 850 (e.g., MAC Address Remapper) is inserted into a running Linux kernel, it may intercept some or all of the outbound ethernet frame traffic for each active bridge.

By doing this, the address remapper 850 may modify and re-route Ethernet and Wi-Fi traffic 801 leaving the system. For example, the address remapper 850 may be used in userland because at least some of the netfilter APIs may be exposed to userland. However, overhead may be counter to this. The address remapper 850 may be expected to operate at close to an interface line-rate to provide its efficiencies and relative performance improvements.

Figure 9:
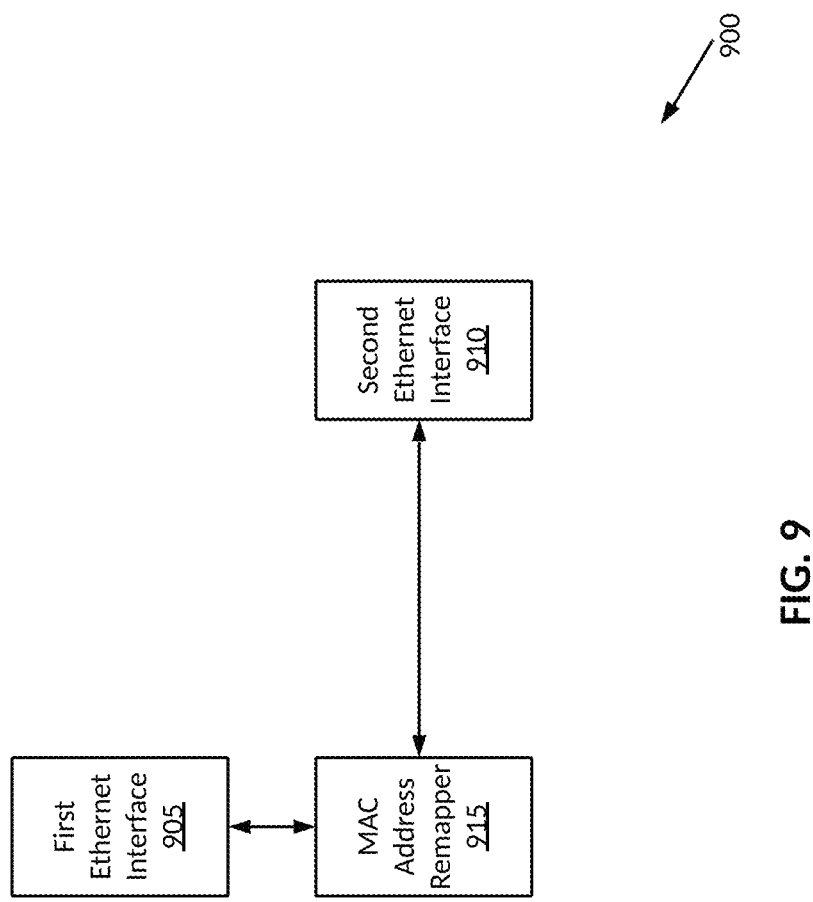
FIG. 9 depicts a multi-channel communications system interfacing with network traffic for the multi-channel communications system depicted in FIG. 8.

FIG. 9 depicts a multi-channel communications system 900 interfacing with network traffic for the multi-channel communications system depicted in FIG. 8. The multi-channel communications system 900 may include a first ethernet interface 905 (e.g., "eth0" or a "computer A"), a second ethernet interface 910 (e.g., "eth1" or a "computer B"), and a third ethernet interface 915 (e.g., "eth2" or a "computer C"). To illustrate a practical application of an address remapper (e.g., a MAC Address Remapper) in practical application and a practical deployment, FIG. 9 provides an example setup depicting a sample Ethernet frame passing through a Linux bridge both with and without an Address remapper component. In some examples, a bridge is described herein as a "Linux bridge," but the bridge may be any like bridge (e.g., software-based or hardware-based) that may be used similarly to perform the techniques described herein.

In the example of FIG. 9, the second ethernet interface 910 acts as an Ethernet switch, for example, as the second ethernet interface 910 is setup with a Linux bridge running a MAC Address Remapper. The first ethernet interface 905 and the third ethernet interface 915 can talk to each other via the second ethernet interface 910 as if they were connected directly using an Ethernet cross-over cable or switch. However, between computer B and C, there are two Ethernet links, and the second ethernet interface 910 may have the same IPv4 address (192.168.1.100) configured so that it may operate on either interface. Logically, however, the third ethernet interface 915 may act as if it only has one IP address. The Linux bridge configuration of a MAC address remapper is shown in, for example, FIG. 10, and may be used to remedy this issue.

Figure 10:
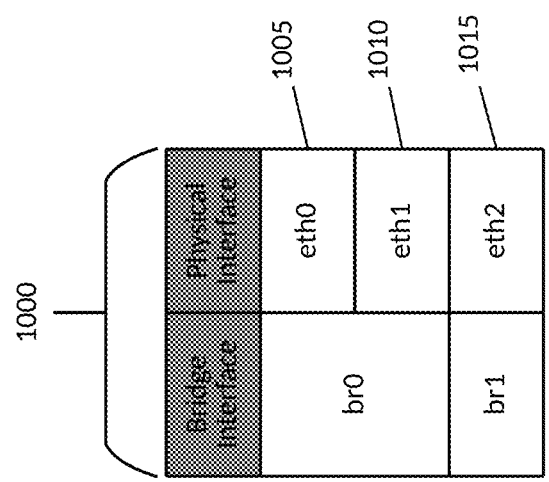
FIG. 10 depicts an example bridge configuration for a bridge of the multi-channel communications system depicted in FIG. 9.

FIG. 10 depicts an example bridge configuration for a bridge of the multi-channel communications system 1000 depicted in FIG. 9. The multi-channel communications system 1000 may include a first ethernet interface 1005 (e.g., "eth0" or a "computer A"), a second ethernet interface 1010 (e.g., "eth1" or a "computer B"), and a third ethernet interface 1015 (e.g., "eth2" or a "computer C"). In the example of FIG. 10, first ethernet interface 1005 may send the third ethernet interface 1015 a UDP/IP packet from UDP port 1234. In this case, the second ethernet interface 1010 may have an address remapper installed, however, it does not have configuration for filtering and/or remapping.

Since computer B is bridging eth0 and eth1 together, the second ethernet interface 1010 only knows the first ethernet interface 1005 by its "00:12:34:AA:BB:CC" MAC address. Therefore, the second ethernet interface 1010 may transmit the UDP packet to said MAC address. The second ethernet interface 1010 may then transmit the frame to computer C using Ethernet interface "eth1". In some examples, if the MAC Address Remapper were not present in the system, the above flow diagram would be the same, but without the "MAC Address Remapper" block, as the "br0" block would connect directly to the "eth1" block.

Figure 11:
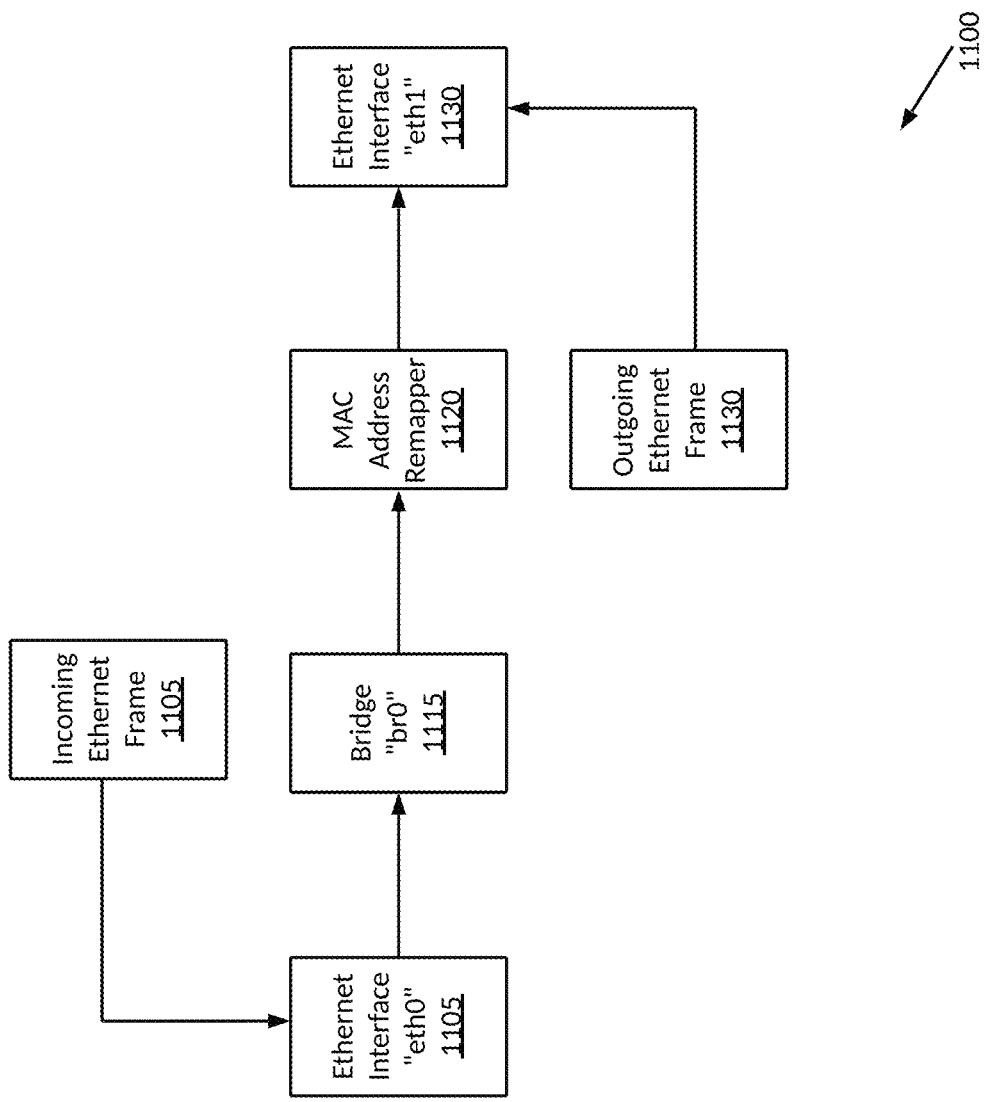
FIG. 11 depicts an example bridge configuration for a bridge including an address remapper of the multi-channel communications system depicted in FIG. 9

FIG. 11 illustrates an example bridge configuration for multi-channel communications using the bridge depicted in FIG. 7.

The multi-channel communications system 1100 may include a bridge 1115 (e.g., "br0"), a first ethernet interface 1105 (e.g., "eth0"), a second ethernet interface 1130 (e.g., "eth1"), an address remapper 1120 (e.g., a MAC Address Remapper), which may each be used to bridge information from incoming ethernet frame 1105 to outgoing ethernet information 1130.

Suppose that the address remapper 1120 is configured to remap all traffic destined for MAC address "00:12:34:AA:BB:CC" to MAC address "00:12:34:AA:BB:DD" and transmit using bridge "br1" conditionally when it matches a frame carrying a UDP/IP packet with a source port of 1234. Replaying traffic flow according to the frame from the previous example, computer B may transmit the frame to computer C using Ethernet interface "eth2" as this is the interface attached to the "br1" Linux bridge device. Computer A has no knowledge of this, nor does it need to know. This gives computer B to ability to make more complex decisions about choosing the best physical path for this traffic. This also opens the door to algorithmic load balancing based on a traffic filtering policy.

A runtime configuration is also provided to provide various functions. For example, the MAC Address Remapper is exposed to userland via the "/proc/macremapctl" file. A user-readable snapshot of the current running configuration can be obtained by simply reading this file. Other operations for configuration of the MAC Address Remapper are done using a system call on the file. More information about the details of this API can be found in files which may be found within the MAC Address Remapper's source tree in a user directory.

In some examples, the MAC Address Remapper may have two configurable types: Filters and Remap Rules. Filters are used to define a criterion to match against for inspecting frames. Remap rules may apply action when their associated filter and MAC address matches.

In some examples, each filter contains a list of field match sets to compare traffic against. If any one of a filter's field match sets positively evaluates a packet, then the filter is considered a match.

In some examples, a single field match set may define any or all the following fields to measure packets:
Packet Minimum Size in Bytes
Single/Subnet/Range Source IP (v4 or v6) Address
Single/Range Source TCP and/or UDP Port
Single/Range Destination TCP and/or UDP Port If a field match set does not define any fields, then it will match everything, thus causing the filter to evaluate all values as true. Each remap rule may have one or more of the following parameters: match destination address; replace destination address (e.g., MAC address); filter; and/or bridge interface (e.g., being optional). For example, a destination MAC address of each frame that passes through the MAC address remapper may be checked against each remap rule's "Match Destination MAC Address" parameter. If a match is found, the frame may be further inspected by measuring it against the matching remap rule's filter. If and only if both the destination MAC address and filter matches, the frame may be remapped. A remap operation on a frame replaces its destination MAC address with the "Replace Destination MAC Address" parameter of the matching remap rule. In some examples (e.g., optionally), a remap operation may also route the matched frame out another bridge. In some examples, a filter may be applied before each rule may be applied.

Figure 12:
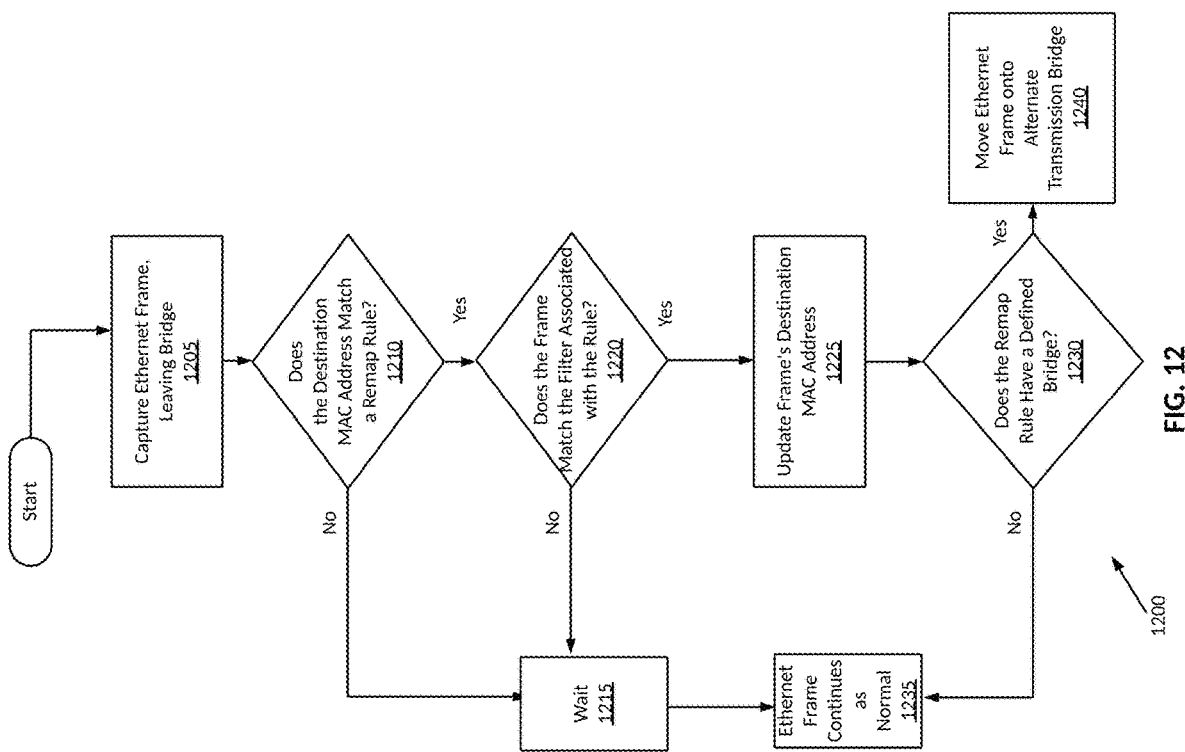
FIG. 12 depicts a flowchart illustrating a method for multi-channel communications for the multi-channel communications system including an address remapper depicted in FIG. 8.

FIG. 12 depicts a flowchart illustrating a method for multi-channel communications for the multi-channel communications system including an address remapper depicted in FIG. 8. Since an address remapper may capture all network traffic leaving every bridge device on the system, it may operate as quickly and efficient as possible. Any bottleneck introduced by the address remapper component may degrade network performance. The address remapper may use the Linux standard RCU locking design pattern to conform with high-performance SMP Linux applications. In some examples, it is expected that the MAC Address Remapper can operate at interface line-rate with a reasonable number of filters and remap rules.

Figure 13:
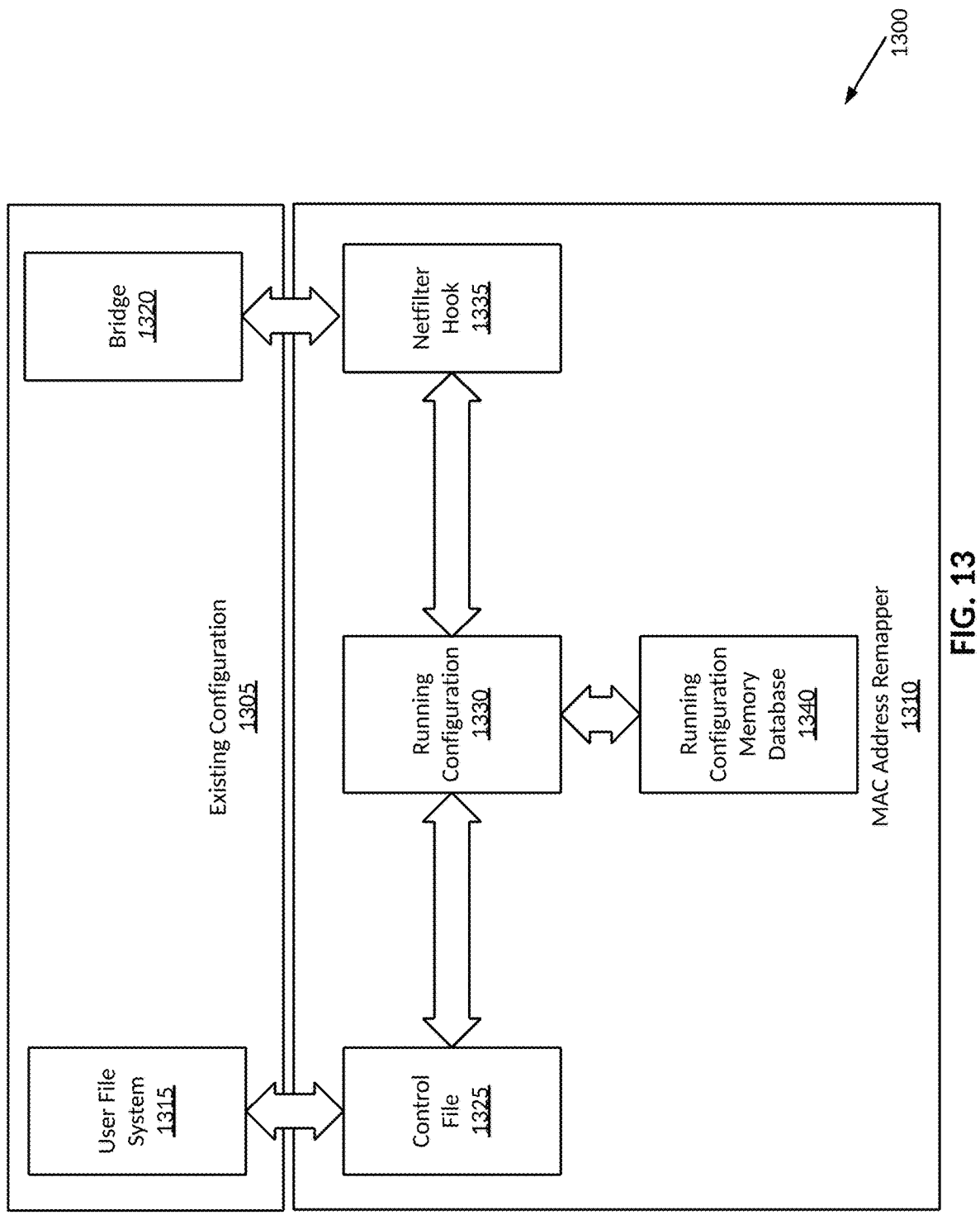
FIG. 13 depicts an example kernel code layout for the multi-channel communications system including an address remapper depicted in FIG. 8.

FIG. 13 illustrates an example kernel code layout 1300 for multi-channel communications using the bridge 1320 depicted in FIG. 7. For example, a running (or existing) configuration 1305 memory database manages memory allocation and concurrency control for the memory which the running configuration 1330 is stored in. The Linux RCU locking paradigm is used for optimal performance in SMP deployments. A running configuration 1330 abstracts and implements the configuration data-model used for all configurable parameters for the MAC address remapper 1310. In some examples, the Running Configuration Memory Database 1340 may store one or more running configurations 1330. A control file 1325 may be used to expose the configuration of the MAC Address Remapper to userland (e.g., in the user file system 1315). The netfilter hook 1335 may be used to process and manipulate the Ethernet traffic.

FIG. 14A and FIG. 14B illustrate exemplary multi-channel communications systems as depicted in FIGS. 1 and 2. In some examples, 10G may not be delivered to a home with only one modem such as by other previous technologies. According to the techniques described herein, however, 10G may be delivered to the home over coax by aggregating six or more OFDM channels. At this time, up to 3.5 gbps can be delivered by using a modem. That may use 4×1G ports, with each port delivering about 1G, thus a combined 3.5G. Some modems currently installed in homes may support sending 1G out across one lane, which is then divided among the (up to) 4 ethernet ports on the modem.

Using currently available technology, 10 gbps+ may be delivered to customers' homes by aggregating multiple OFDM channels and DOCSIS mac-domains. At this time, a single modem can only tune to two 192 MHz OFDM channels. This means that the CMTS manufacturers only output two 192 MHz OFDM channels per mac-domain. If we connect 3-4 cable modems, with each being capable of transferring the 3.5 gbps over (2) 192 MHz OFDM channels, then we can aggregate them on either end of a CMTS and force them to specific MAC domains, it provides 10-14 gbps of bandwidth over a single coax cable using 1.2-1.6 ghz of bandwidth.

In some examples, such as using a modem with a gateway (and with no splitter), a router inside the modem may determine the manner in which to divide the outgoing traffic. A CMTS scheduler may determine which modem is used. Both ends may be reassembled, for example, into two 10 g links, then going into the DOCSIS channel. Some new chips or software upgrades may be required in the modems, but may allow for a fast implementation without major infrastructure upgrades.

Figure 15:
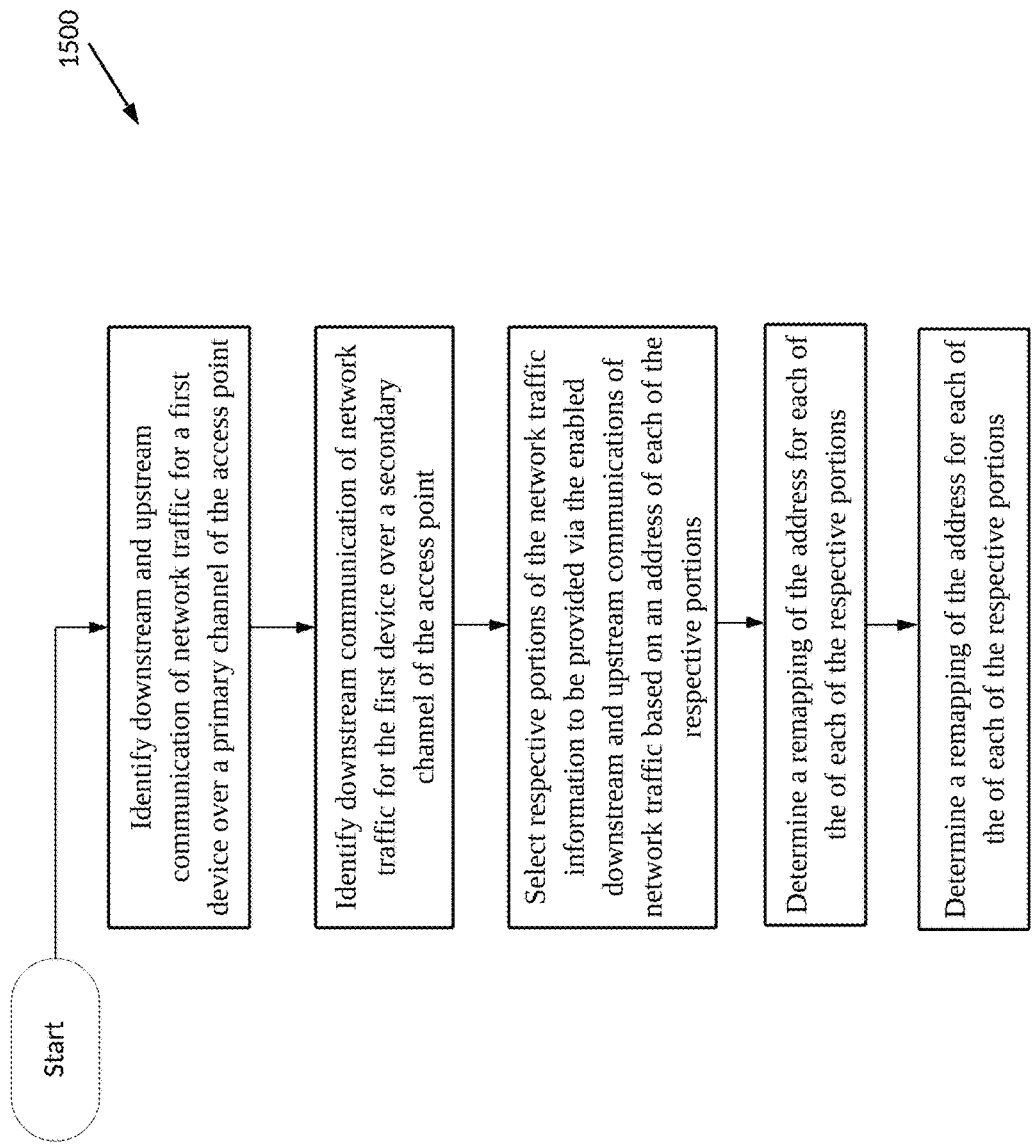
FIG. 15 depicts a flowchart illustrating a method for multi-channel communications for the multi-channel communications system depicted in FIG. 2.

FIG. 15 depicts a flowchart 1500 illustrating a method for multi-channel communications for the multi-channel communications system depicted in FIG. 2.

FIG. 16 depicts a flowchart 1600 illustrating a method for multi-channel communications for the multi-channel communications system depicted in FIGS. 14A-B.

FIG. 17 depicts an AP and a device/client interfacing with network traffic for use with aspects of the multi-channel communications systems depicted in FIG. 2. Initially, a multi-channel (or dual channel) client sends a STA_JOIN request to the AP to join the multi-channel (or dual channel) wireless network. The AP responds with an AP_ACCEPT_STA message if a downstream data/secondary channel is available. The client then associates to the linked data/secondary channel and notifies the AP with an acknowledgement message (STA-ACK). Initially, the linked channel will be associated with the client according to a default traffic filter profile of the AP.

Once an application on the client is opened, either automatically or by the user, the client may determine that a traffic table update is necessary. For example, the client may determine that an update is necessary, and request the traffic filter table from the AP, when (i) an application on the client initiates the request (e.g., an application includes instructions to request a data/secondary channel, if available, upon opening); (ii) an application matching a secondary channel requirement in a look-up table is opened or closed; (iii) data characteristics matching the secondary channel requirement in the look-up table are detected or removed; (iv) data usage of the client meets or exceeds a predetermined threshold; (v) data usage of the client falls below a predetermined threshold; or (vi) a specified period of time has passed. For example, the look-up table may show a data/secondary channel being required or beneficial for specific applications or application types (e.g., video streaming applications, gaming applications) with specific data characteristics, such as high downstream data rates. In some embodiments, a data usage monitor of the client may trigger a request to update the traffic filter table when data usage meets or exceeds a threshold value or when data usage falls below a threshold value. In some embodiments, a virtual interface of the client may periodically review the look-up table or data usage for changes.

Upon request, the AP provides the traffic filter table to the client. The traffic filter table comprises instructions for delivering network traffic to the client over at least one of a primary channel and/or a secondary channel of the wireless network. In an embodiment, the traffic filter table comprises, but is not limited to, one or more of client ID, MAC address, secondary channel(s) assigned, secondary channel(s) connected, secondary channel(s) available, packet type, packet size, source IP, source port, and destination port. The client autonomously, or with input from a user, updates the traffic filter table, and returns the updated table to the AP, which then delivers the network traffic to the client according to the updated traffic filter table. Updating the traffic filter table may be repeated periodically or as needed, e.g., when an application is opened or closed on the client. In an embodiment, the client may update the traffic filter table to reassign network traffic from an assigned secondary channel to a different available secondary channel. For example, reassigning channels may allow the client to select a higher frequency band with increased data rates, to select a lower frequency band for better propagation, to prioritize one frequency band over another for a particular application(s), or to select a different frequency band carrying less network traffic or providing a better quality signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for multi-channel communication between a client and an access point over a wireless network including at least a primary channel and a secondary channel, the method comprising:
   receiving, at an access point, a request from a client for a traffic filter table comprising instructions for delivering network traffic to the client over a secondary channel of a wireless network having a primary channel and the secondary channel;
   providing the traffic filter table to the client;
   receiving, at the access point, an updated traffic filter table from the client; and
   delivering the network traffic to the client according to the updated traffic filter table;
   wherein the updated traffic filter table comprises instructions to reassign the network traffic from the secondary channel to a tertiary channel of the wireless network;
   wherein the traffic filter table comprises one or more of client ID, MAC address, secondary channel(s) assigned, secondary channel(s) connected, secondary channel(s) available, packet type, packet size, source IP, source port, and destination port;
   wherein the request from the client for the traffic filter table is triggered when:
   (i) an application on the client initiates the request;
   (ii) an application matching a secondary channel requirement in a look-up table is opened or closed;
   (iii) data characteristics matching the secondary channel requirement in the look-up table are detected or removed;
   (iv) data usage of the client meets or exceeds a predetermined threshold;
   (v) data usage of the client falls below a predetermined threshold; and/or
   (vi) a specified period of time has passed.

2. A method for multi-channel communication between a client and an access point over a wireless network including at least a primary channel and a secondary channel, the method comprising:
   receiving, at an access point, a request from a client for a traffic filter table comprising instructions for delivering network traffic to the client over a secondary channel of a wireless network having a primary channel and the secondary channel;
   providing the traffic filter table to the client;
   receiving, at the access point, an updated traffic filter table from the client; and
   delivering the network traffic to the client according to the updated traffic filter table;
   further comprising:
   receiving, at the access point, a subsequent request from the client for the updated traffic filter table;
   providing the updated traffic filter table to the client;
   receiving, at the access point, a second updated traffic filter table from the client; and
   delivering the network traffic to the client according to the second updated traffic filter table;
   wherein the request from the client for the updated traffic filter table is triggered when:
   (i) an application on the client initiates the request;
   (ii) an application matching a secondary channel requirement in a look-up table is opened or closed;
   (iii) data characteristics matching the secondary channel requirement in the look-up table are detected or removed;
   (iv) data usage of the client meets or exceeds a predetermined threshold;
   (v) data usage of the client falls below a predetermined threshold; and/or
   (vi) a specified period of time has passed.

3. A method for multi-channel communication between a client and an access point over a wireless network including at least a primary channel and a secondary channel, the method comprising:
   receiving, at an access point, a request from a client for a traffic filter table comprising instructions for delivering network traffic to the client over a secondary channel of a wireless network having a primary channel and the secondary channel;
   providing the traffic filter table to the client;
   receiving, at the access point, an updated traffic filter table from the client; and
   delivering the network traffic to the client according to the updated traffic filter table;
   wherein the request from the client for the updated traffic filter table is triggered when:
   (i) an application on the client initiates the request;
   (ii) an application matching a secondary channel requirement in a look-up table is opened or closed;
   (iii) data characteristics matching the secondary channel requirement in the look-up table are detected or removed;
   (iv) data usage of the client meets or exceeds a predetermined threshold;
   (v) data usage of the client falls below a predetermined threshold; and/or
   (vi) a specified period of time has passed.

* * * * *